(12) United States Patent
Chen

(10) Patent No.: US 12,196,934 B2
(45) Date of Patent: Jan. 14, 2025

(54) LENS ASSEMBLY

(71) Applicants: Sintai Optical (Shenzhen) Co., Ltd., ShenZhen (CN); Asia Optical Co., Inc., Taichung (TW)

(72) Inventor: Ming-Chung Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 331 days.

(21) Appl. No.: 17/684,568

(22) Filed: Mar. 2, 2022

(65) Prior Publication Data

US 2022/0291491 A1    Sep. 15, 2022

(30) Foreign Application Priority Data

Mar. 9, 2021   (TW) ................................. 110108319

(51) Int. Cl.
*G02B 15/14* (2006.01)
*G02B 13/00* (2006.01)
*G02B 27/00* (2006.01)

(52) U.S. Cl.
CPC ... *G02B 15/145121* (2019.08); *G02B 13/009* (2013.01); *G02B 27/0025* (2013.01)

(58) Field of Classification Search
CPC ..................... G02B 15/145121; G02B 13/0045
See application file for complete search history.

(56) References Cited

U.S. PATENT DOCUMENTS

| | | | |
|---|---|---|---|
| 7,468,748 B2 | 12/2008 | Iwasawa | |
| 7,920,332 B2 | 4/2011 | Ohtake | |
| 10,310,255 B2 | 6/2019 | Tashiro | |
| 10,324,279 B2 | 6/2019 | Su et al. | |
| 2007/0139788 A1 | 6/2007 | Watanabe | |
| 2009/0147375 A1* | 6/2009 | Sudoh ................ | G02B 15/1461 359/683 |
| 2011/0194015 A1* | 8/2011 | Kanetaka ........... | G02B 15/1461 359/683 |
| 2011/0228158 A1 | 9/2011 | Imaoka et al. | |
| 2013/0258162 A1 | 10/2013 | Tomioka | |

(Continued)

FOREIGN PATENT DOCUMENTS

| | | |
|---|---|---|
| CN | 1693934 A | 11/2005 |
| CN | 101819317 A | 9/2010 |

(Continued)

*Primary Examiner* — Joseph P Martinez
(74) *Attorney, Agent, or Firm* — McClure, Qualey & Rodack, LLP

(57) ABSTRACT

A lens assembly includes a first lens group, a second lens group, a third lens group, a fourth lens group, a fifth lens group, and a reflective element. The first lens group is with positive refractive power. The second lens group is with negative refractive power. The third lens group is with positive refractive power. The fourth lens group is with negative refractive power. The fifth lens group is with positive refractive power. The reflective element includes a reflective surface. A light from an object side sequentially passes through the first lens group, the second lens group, the third lens group, the fourth lens group, and the fifth lens group to a second side. The reflective element is disposed between a first side and the second side. Intervals of the lens groups are changeable, so that the lens assembly can change the effective focal length.

20 Claims, 29 Drawing Sheets

(56) References Cited

U.S. PATENT DOCUMENTS

2014/0198393 A1\* 7/2014 Sugita ............ G02B 15/144507
                                                      359/680
2020/0064594 A1\* 2/2020 Jeong .................... H04N 23/54

FOREIGN PATENT DOCUMENTS

| | | |
|---|---|---|
| CN | 102129121 A | 7/2011 |
| CN | 102193172 A | 9/2011 |
| CN | 105759409 A | 7/2016 |
| CN | 107479175 A | 12/2017 |
| CN | 111103677 A | 5/2020 |
| CN | 111538148 A | 8/2020 |
| CN | 111650733 A | 9/2020 |
| CN | 111965804 A | 11/2020 |
| JP | 2007003598 A | 1/2007 |
| JP | 2007047538 A | 2/2007 |
| JP | 2007108703 A | 4/2007 |
| JP | 2007108705 A | 4/2007 |
| JP | 2010237453 A | 10/2010 |
| JP | 2015072369 A | 4/2015 |
| JP | 2016085255 A | 5/2016 |
| JP | 2017134304 A | 8/2017 |
| TW | 201241503 A | 10/2012 |
| TW | I440923 B | 6/2014 |
| WO | 2013125603 A1 | 8/2013 |

\* cited by examiner

LENS ASSEMBLY

BACKGROUND OF THE INVENTION

Field of the Invention

The invention relates to a lens assembly.

Description of the Related Art

The total length of the traditional optical zoom lens is significantly longer, and as the zoom magnification becomes larger, the total length of the lens assembly becomes longer. Today's thin and light smartphone cannot be equipped with traditional optical zoom lens. Therefore, a lens assembly needs a new structure having miniaturization, high resolution, and optical zoom at the same time, in order to meet the requirement of smartphone for optical zoom function.

BRIEF SUMMARY OF THE INVENTION

The invention provides a lens assembly to solve the above problems. The lens assembly of the invention is provided with characteristics of a decreased total lens length, an increased resolution, an optical zoom function, and still has a good optical performance.

The lens assembly in accordance with an exemplary embodiment of the invention includes a first lens group, a second lens group, a third lens group, a fourth lens group, a fifth lens group, and a reflective element. The first lens group is with positive refractive power. The second lens group is with negative refractive power. The third lens group is with positive refractive power. The fourth lens group is with negative refractive power. The fifth lens group is with positive refractive power. The reflective element includes a reflective surface. The first lens group, the second lens group, the third lens group, the fourth lens group, and the fifth lens group are arranged in order from a first side to a second side along an axis. A light from an object side sequentially passes through the first lens group, the second lens group, the third lens group, the fourth lens group, and the fifth lens group to the second side. The reflective element is disposed between the first side and the second side. Intervals of the lens groups are changeable, so that the lens assembly can change the effective focal length. The basic operation of the lens assembly in the present invention can be achieved by satisfying the features of the exemplary embodiment without requiring other conditions.

In another exemplary embodiment, the lens assembly further includes a shading element disposed between the first lens group and the second lens group, wherein the shading element includes a variable hole.

In yet another exemplary embodiment, the variable hole can change dimension according to the effective focal length of the lens assembly and the variable hole is a non-circular hole.

In another exemplary embodiment, at least one lens of the lens groups has different effective optical diameters in the short side direction and in the long side direction.

In yet another exemplary embodiment, the third lens group includes a plurality of lenses and some of the lenses can be moved perpendicular to the direction perpendicular to the axis to achieve optical image stabilization.

In another exemplary embodiment, the reflective element is disposed between the first side and the first lens group and the fourth lens group can move along the axis to perform focusing.

In yet another exemplary embodiment, the second lens group, the fourth lens group, and the fifth lens group can move along the axis and the first lens group and the third lens group are fixed to change intervals of the lens groups, so that the lens assembly can change the effective focal length.

In another exemplary embodiment, the lens assembly further includes a stop disposed between the second lens group and the third lens group, wherein the reflective element further includes an incident surface and an exit surface and both of which are connected to the reflective surface, the incident surface faces the object side along the direction perpendicular to the axis, the exit surface faces the second side along the axis, and the lens assembly satisfies at least one of the following conditions: 0.5 mm<EPA/PL<5.5 mm; 0.7 mm<EPA/STD<10 mm; 0.2<EPDX/STD<2.1; 0<EPDY/STD<1.5; 0.8<PL/EPDX<4; 0.7<PH/EPDY<3; wherein EPA is an area of an entrance pupil of the lens assembly, PL is a length of the reflective element, the length is equal to a length of a side of the reflective surface and the side is perpendicular to the axis, STD is a diameter of the stop, EPDX is a maximum entrance pupil interval when the entrance pupil passes through the axis, EPDY is a minimum entrance pupil interval when the entrance pupil passes through the axis, and PH is a height of the reflective element, the height is equal to a length of a side of the exit surface, and the direction of the side is perpendicular to the incident surface.

In yet another exemplary embodiment, the first lens group includes a 1-1 lens and a 1-2 lens, both of which are arranged in order from the first side to the second side along the axis, the second lens group includes a 2-1 lens, a 2-2 lens, and a 2-3 lens, all of which are arranged in order from the first side to the second side along the axis, the third lens group includes a 3-1 lens, a 3-2 lens, a 3-3 lens, and a 3-4 lens, all of which are arranged in order from the first side to the second side along the axis, the fourth lens group includes a 4-1 lens, and the fifth lens group includes a 5-1 lens.

In another exemplary embodiment, the 1-1 lens is a meniscus lens with negative refractive power and the 1-2 lens is a biconvex lens with positive refractive power and includes a convex surface facing the first side along the axis and another convex surface facing the second side along the axis and the 2-1 lens is a meniscus lens with negative refractive power and includes a convex surface facing the first side along the axis and a concave surface facing the second side along the axis, the 2-2 lens is a biconcave lens with negative refractive power and includes a concave surface facing the first side along the axis and another concave surface facing the second side along the axis, and the 2-3 lens is with positive refractive power and includes a convex surface facing the first side along the axis.

In yet another exemplary embodiment, the 3-1 lens is a plano-convex lens with positive refractive power and includes a convex surface facing the first side along the axis and a plane surface facing the second side along the axis, the 3-2 lens is a biconvex lens with positive refractive power and includes a convex surface facing the first side along the axis and another convex surface facing the second side along the axis, the 3-3 lens is a meniscus lens with negative refractive power and includes a concave surface facing the first side along the axis and a convex surface facing the second side along the axis, and the 3-4 lens is a meniscus lens with negative refractive power and includes a convex surface facing the first side along the axis and a concave surface facing the second side along the axis, the 4-1 lens is a meniscus lens with negative refractive power; and the 5-1 lens is a meniscus lens with positive refractive power.

In another exemplary embodiment, the 1-1 lens includes a convex surface facing the first side along the axis and a concave surface facing the second side along the axis and the 2-3 lens further includes a concave surface facing the second side along the axis.

In yet another exemplary embodiment, the 4-1 lens includes a convex surface facing the first side along the axis and a concave surface facing the second side along the axis and the 5-1 lens includes a convex surface facing the first side along the axis and a concave surface facing the second side along the axis.

In another exemplary embodiment, the 1-1 lens includes a concave surface facing the first side along the axis and a convex surface facing the second side along the axis and the 2-3 lens further includes another convex surface facing the second side along the axis.

In yet another exemplary embodiment, the 4-1 lens includes a concave surface facing the first side along the axis and a convex surface facing the second side along the axis and the 5-1 lens includes a concave surface facing the first side along the axis and a convex surface facing the second side along the axis.

In another exemplary embodiment, the lens assembly satisfies at least one of the following conditions: $1.5<f1/fW<2.5$; $-1.1<f2/fW<-0.3$; $0.6<f3/fW<0.8$; $-2<f4/fW<-0.5$; $1<f5/fW<3.5$; wherein f1 is an effective focal length of the first lens group, f2 is an effective focal length of the second lens group, f3 is an effective focal length of the third lens group, f4 is an effective focal length of the fourth lens group, f5 is an effective focal length of the fifth lens group, and fW is an effective focal length of the lens assembly as the lens assembly is at the wide-angle end.

In yet another exemplary embodiment, the reflective element further includes an incident surface connecting the reflective surface, the incident surface faces the object side along the direction perpendicular to the axis, and the lens assembly satisfies at least one of the following conditions: $2<TTL/fW<4.5$; $0.5<fT/TTL<1$; $3.8<TTL/Dmax<5.2$; 7 mm$<Dmax<$12 mm; $2.9<fT/D1r1<4.2$; wherein fW is an effective focal length of the lens assembly as the lens assembly is at the wide-angle end, fT is an effective focal length of the lens assembly as the lens assembly is at the telephoto end, TTL is an interval from the incident surface of the reflective element to an image plane of the reflective element along the direction perpendicular to the axis and the axis, Dmax is a maximum effective optical diameter among all lenses, and D1r1 is an effective optical diameter of a first side surface of a lens closest to the first side.

In another exemplary embodiment, the lens assembly further includes a stop and a shading element, wherein the stop disposed between the second lens group and the third lens group, the shading element disposed between the first lens group and the second lens group, and the shading element includes a variable hole, at least one lens of the lens groups has different effective optical diameters in the short side direction and in the long side direction, the second lens group, the fourth lens group, and the fifth lens group can move along the axis, and the first lens group and the third lens group are fixed to change intervals of the lens groups, so that the lens assembly can change the effective focal length, the reflective element further includes an incident surface and an exit surface and both of which are connected to the reflective surface, the incident surface faces the object side along the direction perpendicular to the axis, the exit surface faces the second side along the axis, and the lens assembly satisfies at least one of the following conditions: $1.5<f1/fW<2.5$; $-1.1<f2/fW<-0.3$; $0.6<f3/fW<0.8$; $-2<f4/fW<-0.5$; $1<f5/fW<3.5$; $2<TTL/fW<4.5$; $0.5<fT/TTL<1$; $3.8<TTL/Dmax<5.2$; 7 mm$<Dmax<$12 mm; $2.9<fT/D1r1<4.2$; 0.5 mm$<EPA/PL<$5.5 mm; 0.7 mm$<EPA/STD<$10 mm; $0.2<EPDX/STD<2.1$; $0<EPDY/STD<1.5$; $0.8<PL/EPDX<4$; $0.7<PH/EPDY<3$; wherein f1 is an effective focal length of the first lens group, f2 is an effective focal length of the second lens group, f3 is an effective focal length of the third lens group, f4 is an effective focal length of the fourth lens group, f5 is an effective focal length of the fifth lens group, fW is an effective focal length of the lens assembly as the lens assembly is at the wide-angle end, fT is an effective focal length of the lens assembly as the lens assembly is at the telephoto end, TTL is an interval from the incident surface of the reflective element to an image plane along the direction perpendicular to the axis and the axis, Dmax is a maximum effective optical diameter among all lenses, D1r1 is an effective optical diameter of a first side surface of a lens closest to the first side, EPA is an area of an entrance pupil of the lens assembly, PL is a length of the reflective element, the length is equal to a length of a side of the reflective surface and the side is perpendicular to the axis, STD is a diameter of the stop, EPDX is a maximum entrance pupil interval when the entrance pupil passes through the axis, EPDY is a minimum entrance pupil interval when the entrance pupil passes through the axis, and PH is a height of the reflective element, the height is equal to a length of a side of the exit surface, and the direction of the side is perpendicular to the incident surface.

In yet another exemplary embodiment, at least one lens of the lens groups has different effective optical diameters in the short side direction and in the long side direction, the third lens group includes a plurality of lenses and some of the lenses can be moved perpendicular to the direction perpendicular to the axis to achieve optical image stabilization, the reflective element is disposed between the first side and the first lens group, and the fourth lens group can move along the axis to perform focusing, the second lens group, the fourth lens group, and the fifth lens group can move along the axis, and the first lens group and the third lens group are fixed to change intervals of the lens groups, so that the lens assembly can change the effective focal length, the reflective element further includes an incident surface and an exit surface and both of which are connected to the reflective surface, the incident surface faces the object side along the direction perpendicular to the axis, the exit surface faces the second side along the axis, and the lens assembly satisfies at least one of the following conditions: $1.5<f1/fW<2.5$; $-1.1<f2/fW<-0.3$; $0.6<f3/fW<0.8$; $-2<f4/fW<-0.5$; $1<f5/fW<3.5$; $2<TTL/fW<4.5$; $0.5<fT/TTL<1$; $3.8<TTL/Dmax<5.2$; 7 mm$<Dmax<$12 mm; $2.9<fT/D1r1<4.2$; 0.5 mm$<EPA/PL<$5.5 mm; 0.7 mm$<EPA/STD<$10 mm; $0.2<EPDX/STD<2.1$; $0<EPDY/STD<1.5$; $0.8<PL/EPDX<4$; $0.7<PH/EPDY<3$; wherein f1 is an effective focal length of the first lens group, f2 is an effective focal length of the second lens group, f3 is an effective focal length of the third lens group, f4 is an effective focal length of the fourth lens group, f5 is an effective focal length of the fifth lens group, fW is an effective focal length of the lens assembly as the lens assembly is at the wide-angle end, fT is an effective focal length of the lens assembly as the lens assembly is at the telephoto end, TTL is an interval from the incident surface of the reflective element to an image plane along the direction perpendicular to the axis and the axis, Dmax is a maximum effective optical diameter among all lenses, D1r1 is an effective optical diameter of a first side surface of a lens closest to the first side, EPA is an area of an entrance pupil of the lens assembly, PL is a length of the reflective element, the length is equal to a length of a side of the reflective surface and the side is perpendicular to the axis, STD is a diameter of the stop, EPDX is a maximum entrance pupil interval when the entrance pupil passes through the axis, EPDY is a minimum entrance pupil interval when the entrance pupil passes through the axis, and PH is a height of the reflective element, the height is equal to a length of a side of the exit surface, and the direction of the side is perpendicular to the incident surface.

In another exemplary embodiment, the first lens group includes a 1-1 lens and a 1-2 lens, both of which are arranged in order from the first side to the second side along the axis, wherein the 1-1 lens is a meniscus lens with negative refractive power and the 1-2 lens is a biconvex lens with positive refractive power and includes a convex surface facing the first side along the axis and another convex surface facing the second side along the axis, the second lens group includes a 2-1 lens, a 2-2 lens, and a 2-3 lens, all of which are arranged in order from the first side to the second side along the axis, wherein the 2-1 lens is a meniscus lens with negative refractive power and includes a convex surface facing the first side along the axis and a concave surface facing the second side along the axis, the 2-2 lens is a biconcave lens with negative refractive power and includes a concave surface facing the first side along the axis and another concave surface facing the second side along the axis, and the 2-3 lens is with positive refractive power and includes a convex surface facing the first side along the axis, the third lens group includes a 3-1 lens, a 3-2 lens, a 3-3 lens, and a 3-4 lens, all of which are arranged in order from the first side to the second side along the axis, wherein the 3-1 lens is a plano-convex lens with positive refractive power and includes a convex surface facing the first side along the axis and a plane surface facing the second side along the axis, the 3-2 lens is a biconvex lens with positive refractive power and includes a convex surface facing the first side along the axis and another convex surface facing the second side along the axis, the 3-3 lens is a meniscus lens with negative refractive power and includes a concave surface facing the first side along the axis and a convex surface facing the second side along the axis, and the 3-4 lens is a meniscus lens with negative refractive power and includes a convex surface facing the first side along the axis and a concave surface facing the second side along the axis, the fourth lens group includes a 4-1 lens which is a meniscus lens with negative refractive power; the fifth lens group includes a 5-1 lens which is a meniscus lens with positive refractive power; the lens assembly further includes a shading element disposed between the first lens group and the second lens group, wherein the shading element includes a variable hole, the variable hole can change dimension according to the effective focal length of the lens assembly and the variable hole is a non-circular hole, at least one lens of the lens groups has different effective optical diameters in the short side direction and in the long side direction, and the lens assembly satisfies at least one of the following conditions: $1.5<f1/fW<2.5$; $-1.1<f2/fW<-0.3$; $0.6<f3/fW<0.8$; $-2<f4/fW<-0.5$; $1<f5/fW<3.5$; $2<TTL/fW<4.5$; $0.5<fT/TTL<1$; $3.8<TTL/Dmax<5.2$; $7 \text{ mm}<Dmax<12 \text{ mm}$; $2.9<fT/D1r1<4.2$; wherein f1 is an effective focal length of the first lens group, f2 is an effective focal length of the second lens group, f3 is an effective focal length of the third lens group, f4 is an effective focal length of the fourth lens group, f5 is an effective focal length of the fifth lens group, fW is an effective focal length of the lens assembly as the lens assembly is at the wide-angle end, fT is an effective focal length of the lens assembly as the lens assembly is at the telephoto end, TTL is an interval from the incident surface of the reflective element to an image plane along the direction perpendicular to the axis and the axis, Dmax is a maximum effective optical diameter among all lenses, and D1r1 is an effective optical diameter of a first side surface of a lens closest to the first side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
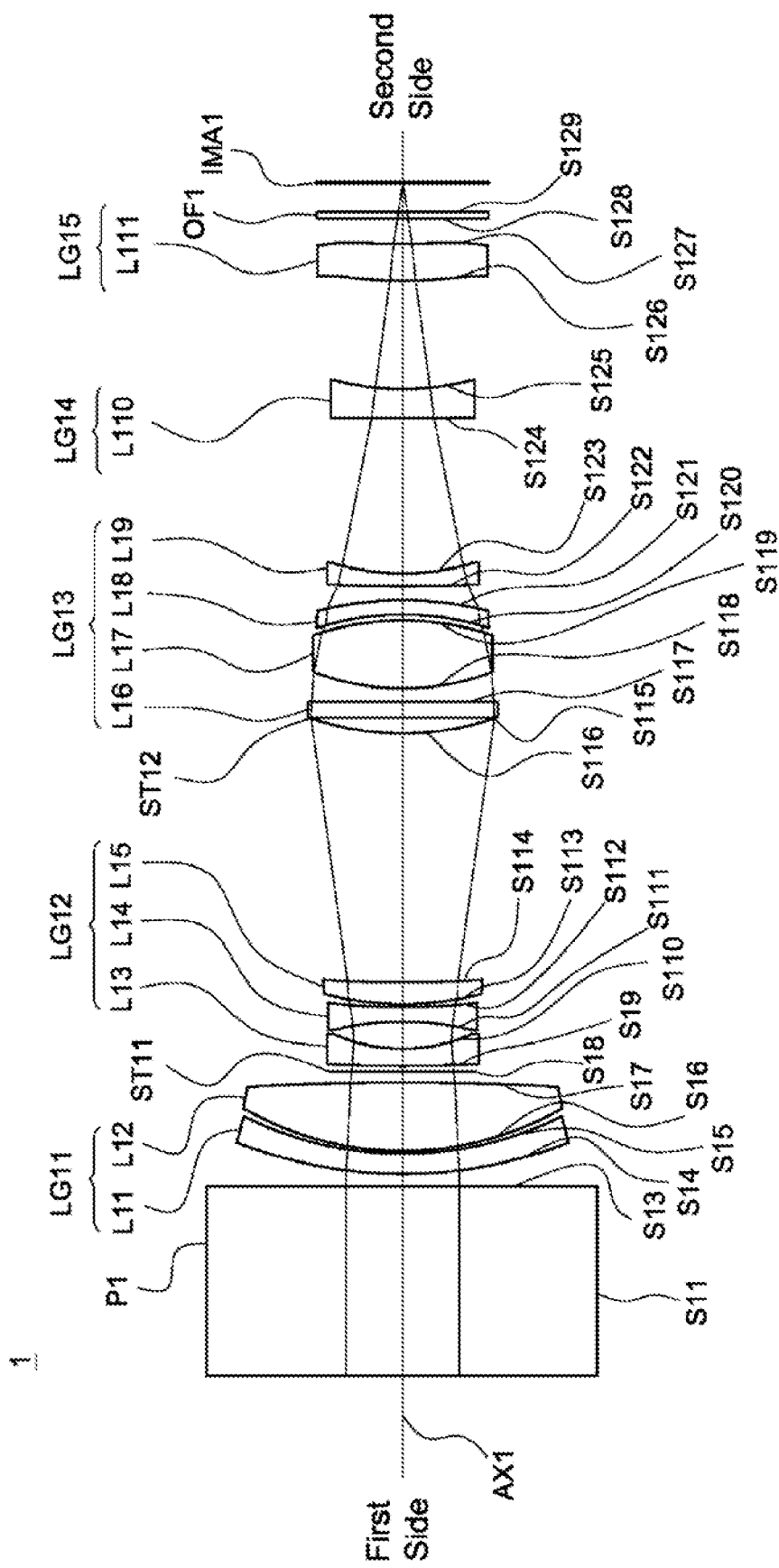
FIG. 1, FIG. 2, and FIG. 3 are lens layout diagrams of a lens assembly at the wide-angle end, the middle end, and the telephoto end in accordance with a first embodiment of the invention, respectively.

The following description is made for the purpose of illustrating the general principles of the invention and should not be taken in a limiting sense. The scope of the invention is best determined by reference to the appended claims.

The present invention provides a lens assembly including a first lens group, a second lens group, a third lens group, a fourth lens group, a fifth lens group, and a reflective element. The first lens group is with positive refractive power. The second lens group is with negative refractive power. The third lens group is with positive refractive power. The fourth lens group is with negative refractive power. The fifth lens group is with positive refractive power. The first lens group, the second lens group, the third lens group, the fourth lens group, and the fifth lens group are arranged in order from a first side to a second side along an axis. A light from an object side sequentially passes through the first lens group, the second lens group, the third lens group, the fourth lens group, and the fifth lens group to the second side. The reflective element includes a reflective surface and is disposed between the first side and the second side. Intervals of the lens groups are changeable, so that the lens assembly can change the effective focal length.

The effective focal length of the lens assembly of the present invention is a variable effective focal length and the zoom magnification of each embodiment of the lens assembly is about 3 times from the wide-angle end to the telephoto end. When the lens assembly is equipped with another fixed-focus wide-angle lens in a mobile phone, tablet or other camera device, the effective focal length of the lens assembly of the present invention has a zoom magnification of 4 to 12 times relative to the effective focal length of the fixed-focus wide-angle lens. Taking the lens assembly of the second embodiment of the present invention as an example, the effective focal length at the wide-angle end is 12.39 mm, the effective focal length at the telephoto end is 37.20 mm, and the zoom magnification is 3.002 (37.20 mm/12.39 mm=3.002) times from the wide-angle end to the telephoto end, which is approximately 3 times, when equipped with a fixed-focus wide-angle lens having an effective focal length of 3.1 mm in a mobile phone, tablet or other camera device and let the effective focal length of the fixed-focus wide-angle lens as the magnification basis, so the lens assembly of the present invention has a zoom magnification ranging from 4 (12.39 mm/3.1 mm=3.99≈4) times to 12 (37.20 mm/3.1 mm=12) times relative to a fixed-focus wide-angle lens with an effective focal length of 3.1 mm.

Referring to Table 1, Table 2, Table 4, Table 5, Table 7, Table 8, Table 10, and Table 11, wherein Table 1, Table 4, Table 7, and Table 10 show optical specification in accordance with a first, second, third, and fourth embodiments of the invention, respectively and Table 2, Table 5, Table 8, and Table 11 show aspheric coefficients of each aspheric lens in Table 1, Table 4, Table 7, and Table 10, respectively. FIG. 1, FIG. 7, FIG. 12, and FIG. 17 are lens layout diagrams of a lens assembly at the wide-angle end in accordance with a first, second, third, and fourth embodiments of the invention, respectively. FIG. 2, FIG. 8, FIG. 13, and FIG. 18 are lens layout diagrams of the lens assembly at the middle end in accordance with the first, second, third, and fourth embodiments of the invention, respectively. FIG. 3, FIG. 9, FIG. 14, and FIG. 19 are lens layout diagrams of the lens assembly at the telephoto end in accordance with the first, second, third, and fourth embodiments of the invention, respectively.

The reflective element P1, P2, P3, P4 includes an incident surface S11, S21, S31, S41, a reflective surface S12, S22, S32, S42 (not shown), and an exit surface S13, S23, S33, S43. The first lens groups LG11, LG21, LG31, LG41 is with positive refractive power and includes a 1-1 lens L11, L21, L31, L41 and a 1-2 lens L12, L22, L32, L42. The second lens groups LG12, LG22, LG32, LG42 is with negative refractive power and includes a 2-1 lens L13, L23, L33, L43, a 2-2 lens L14, L24, L34, L44, and a 2-3 lens L15, L25, L35, L45. The third lens group LG13, LG23, LG33, LG43 is with positive refractive power and includes a 3-1 lens L16, L26, L36, L46, a 3-2 lens L17, L27, L37, L47, a 3-3 lens L18, L28, L38, L48, and a 3-4 lens L19, L29, L39, L49. The fourth lens group LG14, LG24, LG34, LG44 is with negative refractive power and includes a 4-1 lenses L110, L210, L310, L410. The fifth lens group LG15, LG25, LG35, LG45 is with positive refractive power and includes a 5-1 lens L111, L211, L311, L411.

The reflective elements P1, P2, P3, P4 are made of glass or plastic material, wherein the incident surfaces S11, S21, S31, S41 connect to the reflective surfaces S12, S22, S32, S42 (not shown) and are perpendicular to the exit surfaces S13, S23, S33, S43. The incident surfaces S11, S21, S31, S41, the reflective surfaces S12, S22, S32, S42 (not shown), and the exit surfaces S13, S23, S33, S43 are plane surfaces.

The 1-1 lenses L11, L21, L31, L41 are meniscus lenses with negative refractive power and made of glass material, wherein both of the first side surfaces S14, S24, S34, S44 and second side surfaces S15, S25, S35, S45 are spherical surfaces.

The 1-2 lenses L12, L22, L32, L42 are biconvex lenses with positive refractive power and made of glass material, wherein the first side surfaces S16, S26, S36, S46 are convex surfaces, the second side surfaces S17, S27, S37, S47 are convex surfaces, the first side surfaces S16, S26, S36, S46 are spherical surfaces, and the second side surfaces S17, S27, S37, S47 are aspheric surfaces.

The shading elements ST11, ST21, ST31, ST41 include a variable hole. The variable hole is a non-circular hole and can change dimension according to the effective focal length of the lens assembly. The above shading elements are variable shades, wherein the non-circular hole is viewed from the axis direction, the shape of the non-circular hole can be polygon, polygon symmetrical to axis, polygon asymmetric to axis, racetrack shape, bottle shape, oak barrel shape, wave shape, flower shape, leaf shape, cloud shape, star shape, zigzag shape, heart shape, shape composed of straight lines and arcs, or shape composed of irregular lines. Such a design is benefit to the effective reduction in size, thickness and volume of the lens assembly, wherein some of the shapes such as wave, cloud, star, and zigzag can also reduce stray light and ghost images.

The 2-1 lenses L13, L23, L33, L43 are meniscus lenses with negative refractive power and made of glass material, wherein the first side surfaces S19, S29, S39, S49 are convex surfaces, the second side surfaces S110, S210, S310, S410 are concave surfaces, the first side surfaces S19, S29, S39, S49 are aspheric surfaces, and the second side surfaces S110, S210, S310, S410 are spherical surfaces.

The 2-2 lenses L14, L24, L34, L44 are biconcave lenses with negative refractive power and made of glass material, wherein the first side surfaces S111, S211, S311 S411 are concave surfaces, the second side surfaces S112, S212, S312, S412 are concave surfaces, and both of the first side surfaces S111, S211, S311 S411 and second side surfaces S112, S212, S312, S412 are spherical surfaces.

The 2-3 lenses L15, L25, L35, L45 are with positive refractive power and made of glass material, wherein the first side surfaces S113, S213, S313 S413 are convex surfaces and both of the first side surfaces S113, S213, S313 S413 and second side surfaces S114, S214, S314, S414 are aspheric surfaces.

The holes of the stop ST12, ST22, ST32, ST42 are fixed in dimension and shaped in non-circular.

The 3-1 lenses L16, L26, L36, L46 are plano-convex lenses with positive refractive power and made of glass material, wherein the first side surfaces S116, S216, S316, S416 are convex surfaces, the second side surfaces S117, S217, S317, S417 are plane surfaces, and the first side surfaces S116, S216, S316, S416 are aspheric surfaces.

The 3-2 lenses L17, L27, L37, L47 are biconvex lenses with positive refractive power and made of glass material, wherein the first side surfaces S118, S218, S318, S418 are convex surfaces, the second side surfaces S119, S219, S319, S419 are convex surfaces, and both of the first side surfaces S118, S218, S318, S418 and second side surfaces S119, S219, S319, S419 are aspheric surfaces.

The 3-3 lenses L18, L28, L38, L48 are meniscus lenses with negative refractive power and made of glass material, wherein the first side surfaces S120, S220, S320, S420 are concave surfaces, the second side surfaces S121, S221, S321, S421 are convex surfaces, the first side surfaces S120, S220, S320, S420 are spherical surfaces, and the second side surfaces S121, S221, S321, S421 are aspheric surfaces.

The 3-4 lenses L19, L29, L39, L49 are meniscus lenses with negative refractive power and made of glass material, wherein the first side surfaces S122, S222, S322, S422 are convex surfaces, the second side surfaces S123, S223, S323, S423 are concave surfaces, the first side surfaces S122, S222, S322, S422 are aspheric surfaces, and the second side surfaces S123, S223, S323, S423 are spherical surfaces.

The 4-1 lenses L110, L210, L310, L410 are meniscus lenses with negative refractive power and made of plastic material, wherein both of the first side surfaces S124, S224, S324, S424 and second side surfaces S125, S225, S325, S425 are aspheric surfaces.

The 5-1 lenses L111, L211, L311, L411 are meniscus lenses with positive refractive power and made of plastic material, wherein both of the first side surfaces S126, S226, S326, S426 and second side surfaces S127, S227, S327, S427 are aspheric surfaces.

In addition, the lens assemblies 1, 2, 3, 4 satisfy at least one of the following conditions:

$$1.5 < f1/fW < 2.5; \tag{1}$$

$$-1.1 < f2/fW < -0.3; \tag{2}$$

$$0.6 < f3/fW < 0.8; \tag{3}$$

$$-2 < f4/fW < -0.5; \tag{4}$$

$$1 < f5/fW < 3.5; \tag{5}$$

$$2 < TTL/fW < 4.5; \tag{6}$$

$$0.5 < fT/TTL < 1; \tag{7}$$

$$7 \text{ mm} < D\max < 12 \text{ mm}; \tag{8}$$

$$3.8 < TTL/D\max < 5.2; \tag{9}$$

$$2.9 < fT/D1r1 < 4.2; \tag{10}$$

$$0.5 \text{ mm} < EPA/PL < 5.5 \text{ mm}; \tag{11}$$

$$0.7 \text{ mm} < EPA/STD < 10 \text{ mm}; \tag{12}$$

$$0.2 < EPDX/STD < 2.1; \tag{13}$$

$$0 < EPDY/STD < 1.5; \tag{14}$$

$$0.8 < PL/EPDX < 4; \tag{15}$$

$$0.7 < PH/EPDY < 3; \tag{16}$$

wherein f1 is an effective focal length of the first lens groups LG11, LG21, LG31, LG41 for the first to fourth embodiments, f2 is an effective focal length of the second lens groups LG12, LG22, LG32, LG42 for the first to fourth embodiments, f3 is an effective focal length of the third lens groups LG13, LG23, LG33, LG43 for the first to fourth embodiments, f4 is an effective focal length of the fourth lens groups LG14, LG24, LG34, LG44 for the first to fourth embodiments, f5 is an effective focal length of the fifth lens groups LG15, LG25, LG35, LG45 for the first to fourth embodiments, fW is an effective focal length of the lens assemblies 1, 2, 3, 4 at the wide-angle end for the first to fourth embodiments, fT is an effective focal length of the lens assemblies 1, 2, 3, 4 at the telephoto end for the first to fourth embodiments, TTL is respectively an interval from the incident surfaces S11, S21, S31, S41 of the reflective elements P1, P2, P3, P4 to image planes IMA1, IMA2, IMA3, IMA4 along the direction perpendicular to the axes AX1, AX2, AX3, AX4 and the axes AX1, AX2, AX3, AX4 for the first to fourth embodiments, Dmax is a maximum effective optical diameter among all lenses for the first to fourth embodiments, D1r1 is an effective optical diameter of the first side surfaces S14, S24, S34, S44 of the lenses L11, L21, L31, L41 closest to first side for the first to fourth embodiments, EPA is an area of an entrance pupil of the lens assemblies 1, 2, 3, 4 for the first to fourth embodiments, PL is a length of the reflective elements P1, P2, P3, P4, wherein the length is equal to a length of a side of the reflective surfaces S12, S22, S32, S42 (not shown) and the side is perpendicular to the axes AX1, AX2, AX3, AX4 for the first to fourth embodiments, STD is a diameter of the stops ST12, ST22, ST32, ST42 for the first to fourth embodiments, EPDX is a maximum entrance pupil interval when the entrance pupil passes through the axis AX1, AX2, AX3, AX4 for the first to fourth embodiments, EPDY is a minimum entrance pupil interval when the entrance pupil passes through the axis AX1, AX2, AX3, AX4 for the first to fourth embodiments, and PH is a height of the reflective elements P1, P2, P3, P4, wherein the height is equal to a length of a side of the exit surfaces S13, S23, S33, S43 and the direction of the side is perpendicular to the incident surfaces S11, S21, S31, S41 for the first to fourth embodiments. With the lens assemblies 1, 2, 3, 4 satisfying at least one of the above conditions (1)-(16), the total lens length can be effectively shortened, the thickness can be effectively shortened, the resolution can be effectively increased, the brightness uniformity can be effectively increased, the aberration can be effectively corrected, the chromatic aberration can be effectively corrected, and optical zoom function can be realized.

Figure 2:
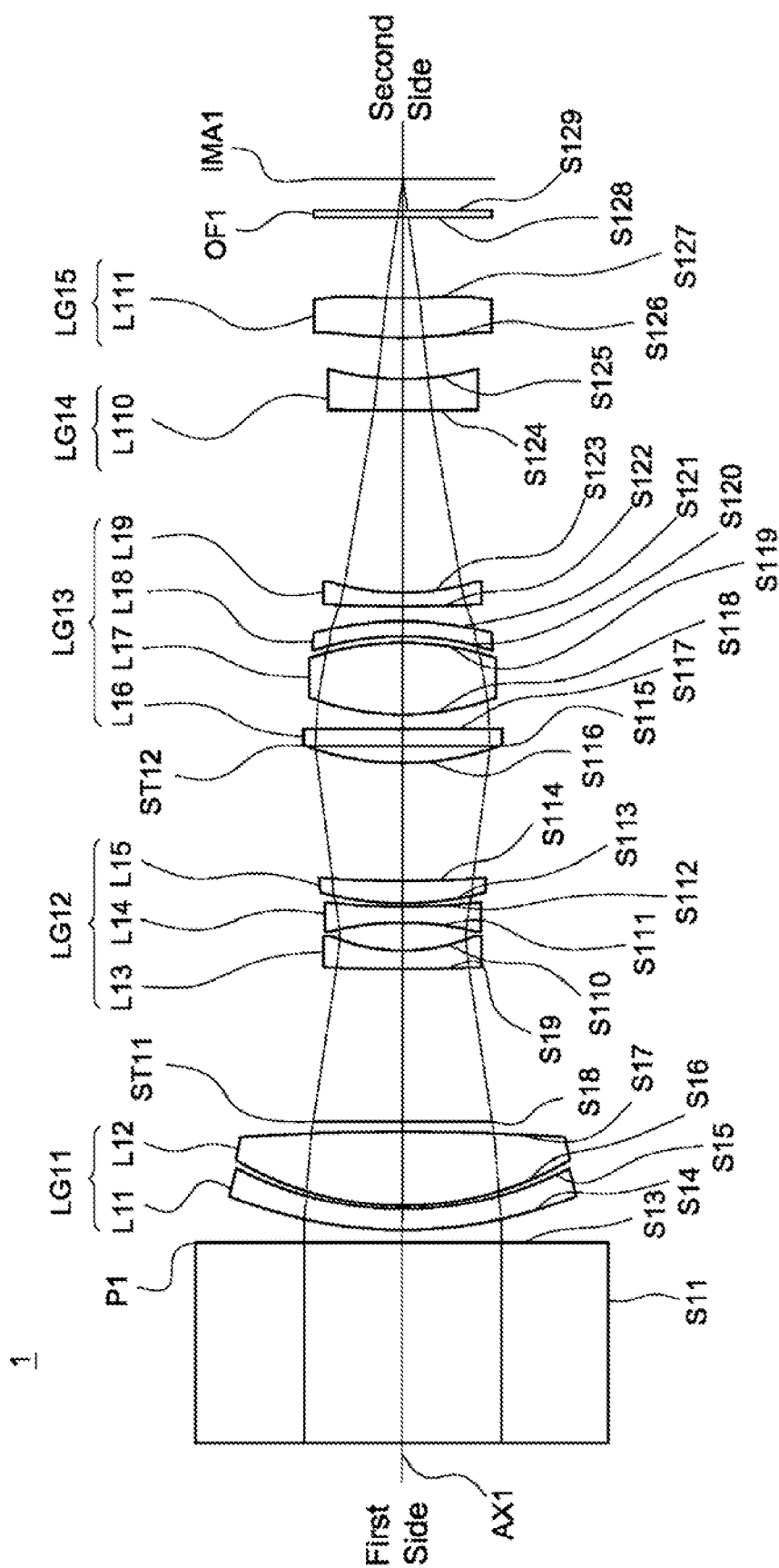
Figure 3:
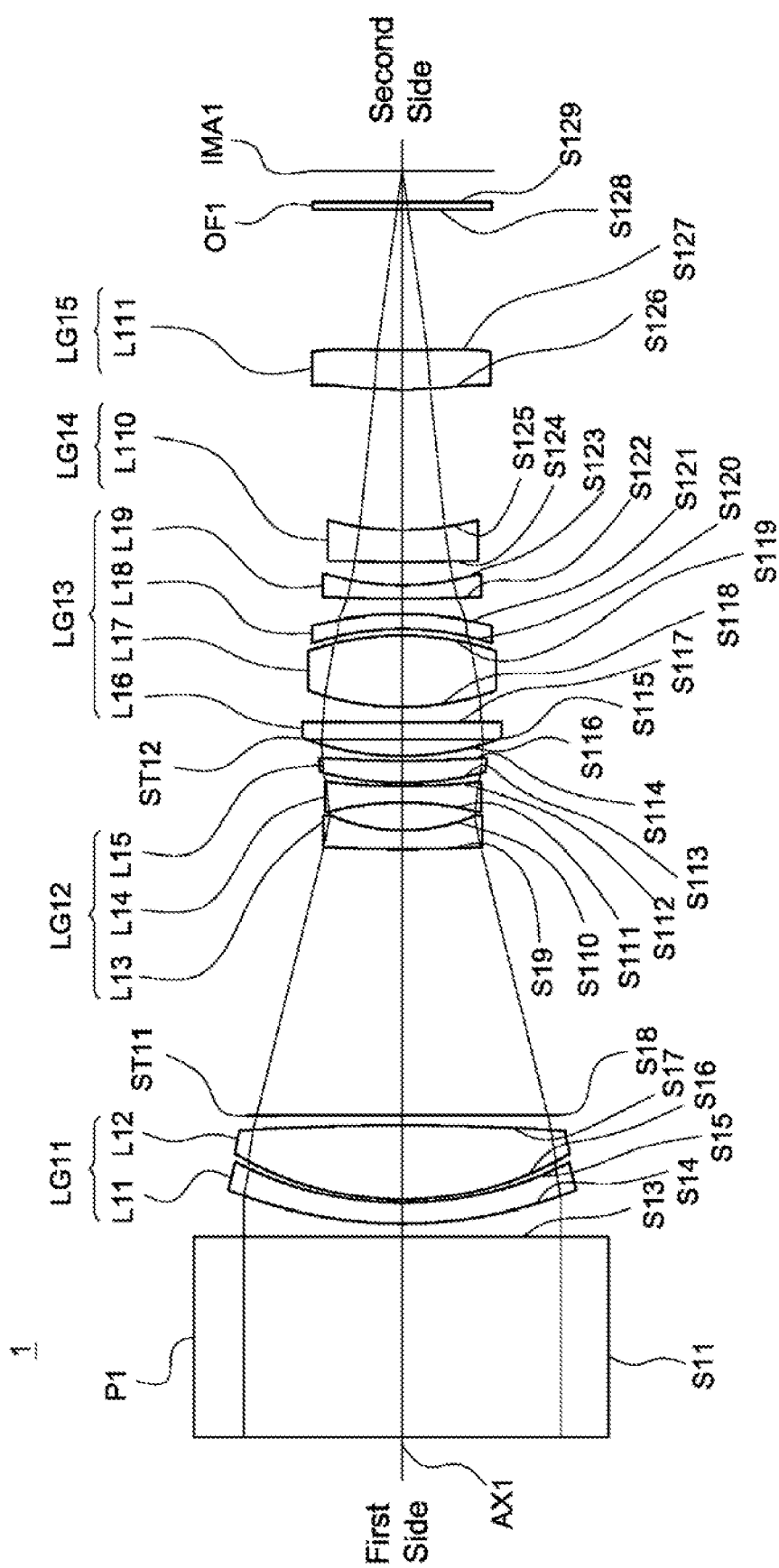
Figure 4A:
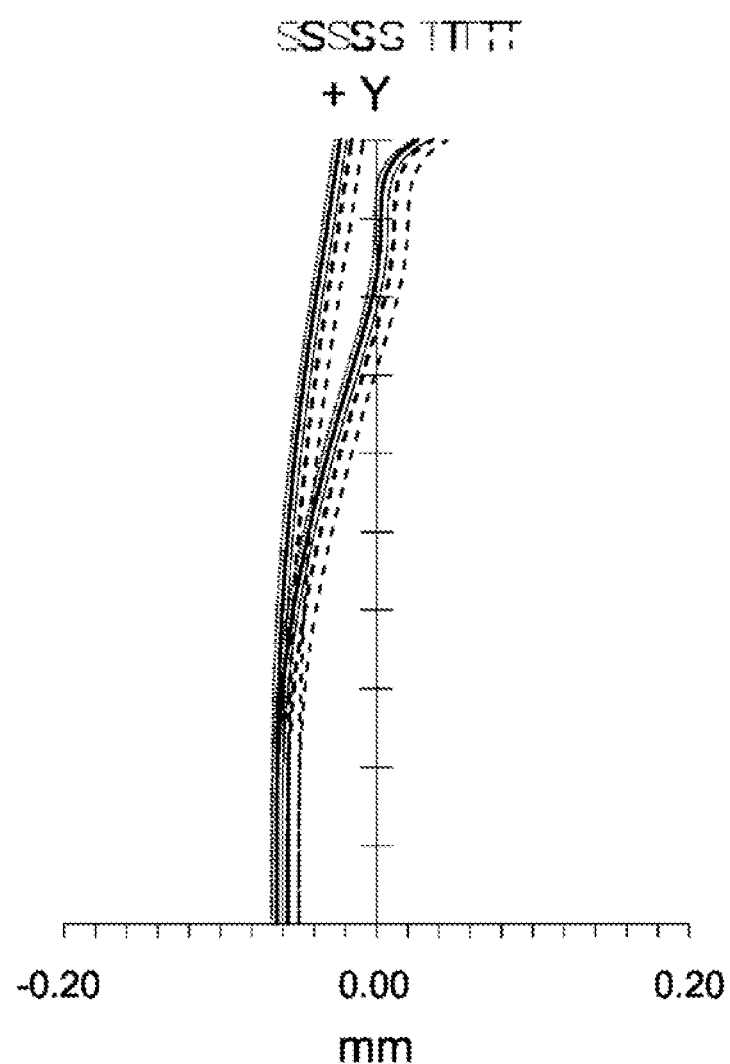
FIG. 4A and FIG. 4B depict a field curvature diagram and a distortion diagram of the lens assembly at the wide-angle end in accordance with the first embodiment of the invention, respectively.
Figure 4B:
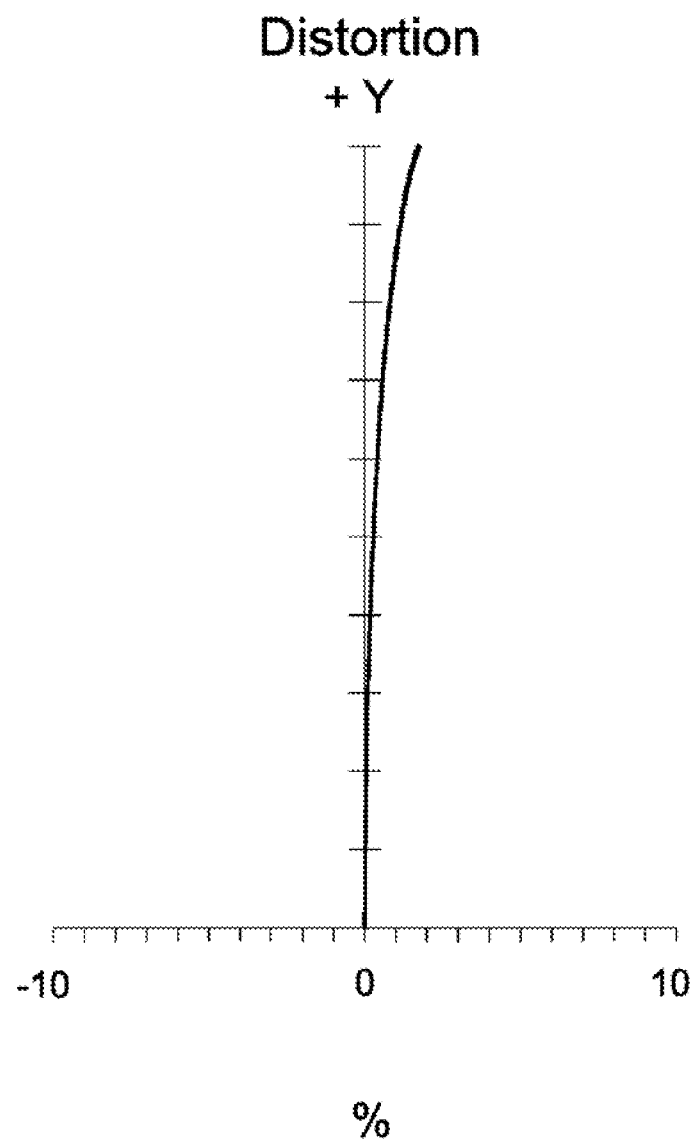
Figure 5A:
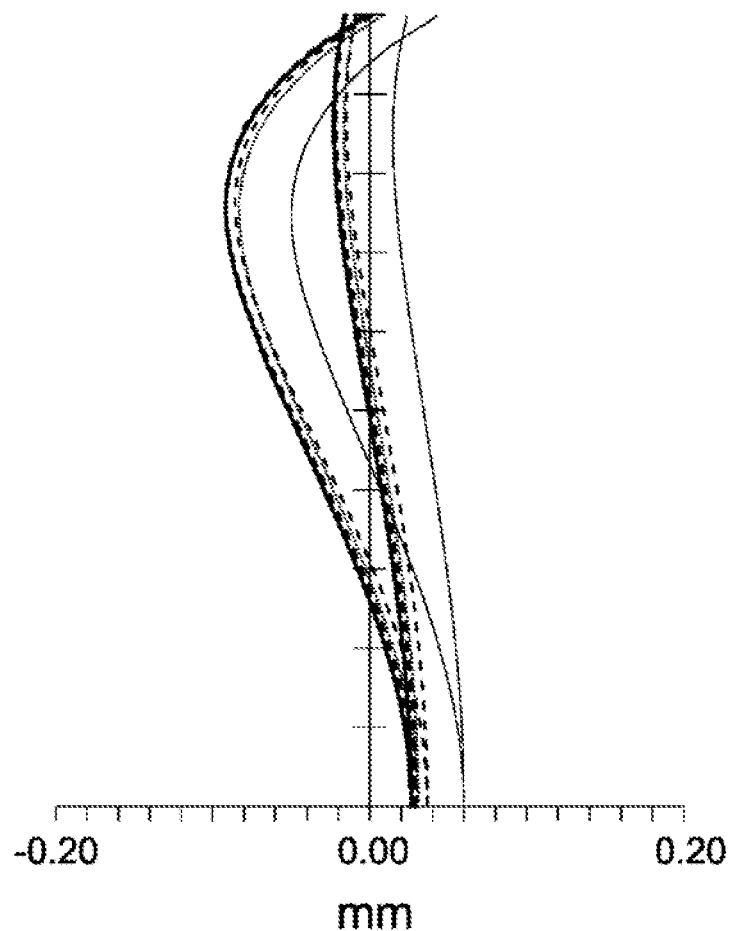
FIG. 5A and FIG. 5B depict a field curvature diagram and a distortion diagram of the lens assembly at the telephoto end in accordance with the first embodiment of the invention, respectively.
Figure 5B:
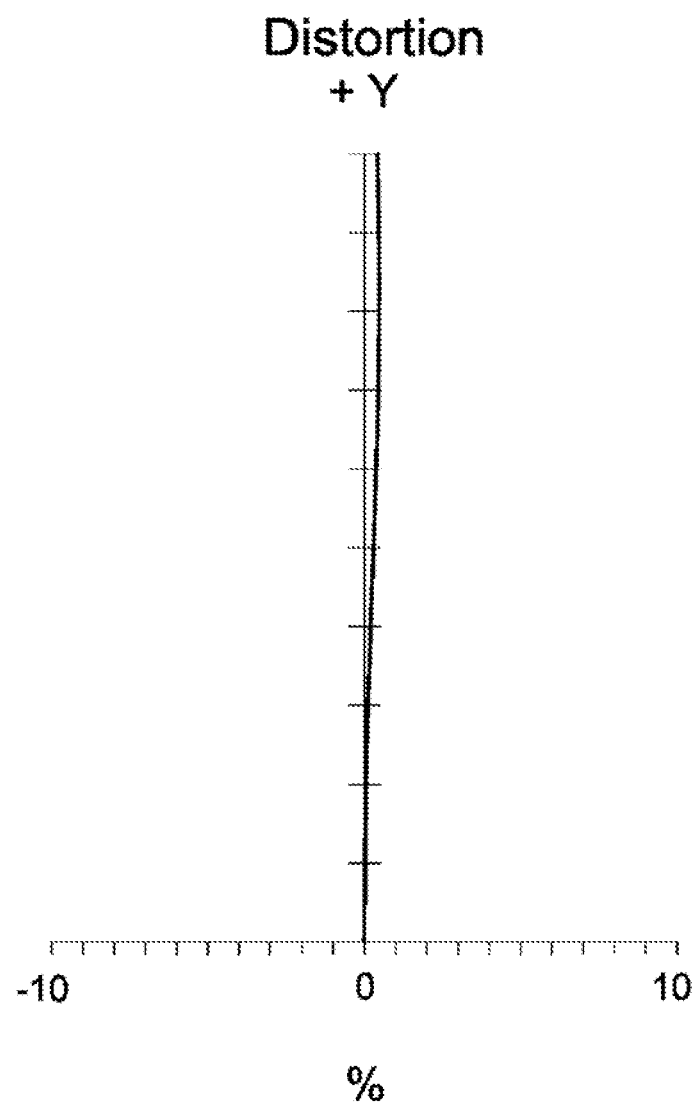

A detailed description of a lens assembly in accordance with a first embodiment of the invention is as follows. Referring to FIG. 1, FIG. 2, and FIG. 3, the lens assembly 1 includes a reflective element P1, a first lens group LG11, a shading element ST11, a second lens group LG12, a stop ST12, a third lens group LG13, a fourth lens group LG14, a fifth lens group LG15, and an optical filter OF1, all of which are arranged in order from a first side to a second side along an axis AX1. The first lens group LG11 includes a 1-1 lens L11 and a 1-2 lens L12, both of which are arranged in order from the first side to the second side along the axis AX1. The second lens group LG12 includes a 2-1 lens L13, a 2-2 lens L14, and a 2-3 lens L15, all of which are arranged in order from the first side to the second side along the axis AX1. The third lens group LG13 includes a 3-1 lens L16, a 3-2 lens L17, a 3-3 lens L18, and a 3-4 lens L19, all of which are arranged in order from the first side to the second side along the axis AX1. The fourth lens group LG14 includes a 4-1 lens L110. The fifth lens group LG15 includes a 5-1 lens L111. The incident surface S11 facing an object side (not shown) along the direction perpendicular to the axis. In operation, a light from the object side (not shown) incident on the reflective element P1 from the incident surface S11 first, then reflected by the reflective surface S12 (not shown) to change propagation direction, then sequentially passes through the exit surface S13, the first lens group LG11, the shading element ST11, the second lens group LG12, the stop ST12, the third lens group LG13, the fourth lens group LG14, the fifth lens group LG15, and the optical filter OF1, and finally imaged on an image plane IMA1. The image plane IMA1 is perpendicular to the incident surface S11 and parallel to the exit surface S13. In the first embodiment, the reflective element P1 is a prism and is not limited thereto. The reflective element P1 can also be a mirror and only includes a reflective surface. In the above description, the first side is the conventional object side and the second side is the conventional image side.

When the lens assembly 1 zooms from the wide-angle end (as shown in FIG. 1) to the middle end (as shown in FIG. 2), the first lens group LG11 is fixed, the second lens group LG12 moves to the second side along the axis AX1, the third lens group LG13 is fixed, the fourth lens group LG14 moves to the second side along the axis AX1, and the fifth lens group LG15 moves to the first side along the axis AX1, so that the interval between the first lens group LG11 and the second lens group LG12 is increased, the interval between the second lens group LG12 and the third lens group LG13 is decreased, the interval between the third lens group LG13 and the fourth lens group LG14 is increased, the interval between the fourth lens group LG14 and the fifth lens group LG15 is decreased, and the interval between the fifth lens group LG15 and the optical filter OF1 is increased. When the lens assembly 1 zooms from the middle end (as shown in FIG. 2) to the telephoto end (as shown in FIG. 3), the first lens group LG11 is fixed, the second lens group LG12 moves to the second side along the axis AX1, the third lens group LG13 is fixed, the fourth lens group LG14 moves to the first side along the axis AX1, and the fifth lens group LG15 moves to the first side along the axis AX1, so that the interval between the first lens group LG11 and the second lens group LG12 is increased, the interval between the second lens group LG12 and the third lens group LG13 is decreased, the interval between the third lens group LG13 and the fourth lens group LG14 is decreased, the interval between the fourth lens group LG14 and the fifth lens group LG15 is increased, and the interval between the fifth lens group LG15 and the optical filter OF1 is increased. The zoom magnification is approximately 3 times (36.25 mm/12.41 mm≈2.9) as the lens assembly 1 of the first embodiment zooms from the wide-angle end (as shown in FIG. 1) to the telephoto end (as shown in FIG. 3).

The shading element ST11 includes a variable hole (not shown) and the variable hole (not shown) can be changed in dimension by a driving element (not shown) driving the mechanism to achieve multi-stage changes in hole size. When the lens assembly 1 zooms from the wide-angle end (as shown in FIG. 1) to the middle end (as shown in FIG. 2) and from the middle end (as shown in FIG. 2) to the telephoto end (as shown in FIG. 3), the variable hole (not shown) of the shading element ST11 will change according to the effective focal length of the lens assembly 1. The correspondingly change in the size of the variable hole leads to change f-Number.

Figure 6:
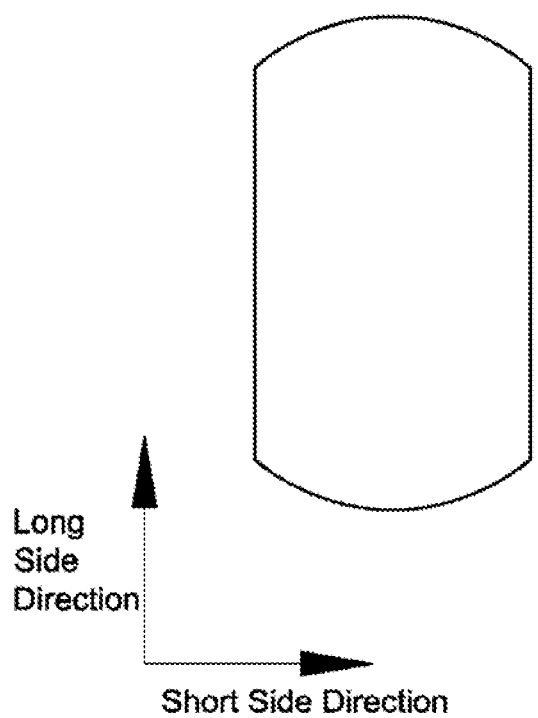
FIG. 6 depicts an effective optical diameter of the lens in the short side direction and long side direction of the lens assembly at the telephoto end in accordance with the first embodiment of the invention.

Among the first lens group LG11, the second lens group LG12, the third lens group LG13, the fourth lens group LG14, and the fifth lens group LG15, the effective optical range is non-circular symmetry for at least one lens, so that the effective optical diameter of the short side direction is different from the effective optical diameter of the long side direction. The region of the effective optical diameter is non-circular when lens is viewed from the axis direction, wherein the length of the long side is the maximum diameter which passes through the axis and the length of the short side is the minimum diameter which passes through the axis. FIG. 6 shows the effective optical diameter of the lens in the short side direction and long side direction when the lens assembly 1 of the first embodiment is at the telephoto end. From FIG. 6, it can be seen that the effective optical diameter of the long side direction is significantly larger than that of the short side direction.

The 3-2 lens L17 and 3-3 lens L18 of the third lens group LG13 can move perpendicular to the axis AX1 to achieve optical image stabilization. The fourth lens group LG14 can move along the axis AX1 to achieve auto focus.

According to the foregoing, wherein: the first side surface S14 of the 1-1 lens L11 is a convex surface and the second side surface S15 of the 1-1 lens L11 is a concave surface; the 2-3 lens L15 is a meniscus lens, wherein the second side surface S114 is a concave surface; the first side surface S124 of the 4-1 lens L110 is a convex surface and the second side surface S125 of the 4-1 lens L110 is a concave surface; the first side surface S126 of the 5-1 lens L111 is a convex surface and the second side surface S127 of the 5-1 lens L111 is a concave surface; and both of the first side surface S128 and second side surface S129 of the optical filter OF1 are plane surfaces.

With the above design of the lenses, reflective element P1, shading element ST11, stop ST12, and at least one of the conditions (1)-(10) satisfied, the lens assembly 1 can have an effective shortened total lens length, an effective decreased thickness, an effective increased resolution, an effective increased brightness uniformity, an effective corrected aberration, an effective corrected chromatic aberration, and a realized optical zoom function. The preferred embodiment of the present invention can be achieved when the lens assembly satisfies conditions (1)-(10), refractive power distribution, and surface shape.

Table 1 shows the optical specification of the lens assembly 1 in FIG. 1, FIG. 2, and FIG. 3 when the lens assembly 1 is at the wide-angle end, middle end, and telephoto end, respectively.

TABLE 1

| | | |
|---|---|---|
| Wide-angle End | Effective Focal Length = 12.41 mm | F-number = 3.85 |
| | Total Lens Length = 40.258 mm | Field of View = 23.442 degrees |
| Middle End | Effective Focal Length = 22.08 mm | F-number = 3.94 |
| | Total Lens Length = 40.258 mm | Field of View = 13.450 degrees |
| Telephoto End | Effective Focal Length = 36.25 mm | F-number = 4.00 |

TABLE 1-continued

| | Total Lens Length 40.258 = mm | | | Field of View = 8.284 degrees | | |
|---|---|---|---|---|---|---|
| Surface Number | Radius of Curvature (mm) | Thickness (mm) | Nd | Vd | Effective Focal Length (mm) | Remark |
| S11 | ∞ | 3.2 | 1.52 | 64.1 | | P1 |
| S12 | ∞ | 3.2 | 1.52 | 64.1 | | |
| S13 | ∞ | 0.400 | | | | |
| S14 | 12.334 | 0.700 | 1.85 | 23.8 | −67.76 | L11 |
| S15 | 9.881 | 0.088 | | | | |
| S16 | 8.838 | 2.335 | 1.49 | 84.5 | 15.80 | L12 |
| S17 | −53.531 | 0.319 | | | | |
| S18 | ∞ | 0.213 | | | | ST11 |
| | | (Wide-angle End) 4.857 | | | | |
| | | (Middle End) 8.476 | | | | |
| | | (Telephoto End) | | | | |
| S19 | 69.905 | 0.600 | 1.49 | 84.5 | −10.89 | L13 |
| S110 | 4.906 | 0.898 | | | | |
| S111 | −7.789 | 0.500 | 1.74 | 49.2 | −7.33 | L14 |
| S112 | 18.479 | 0.102 | | | | |
| S113 | 8.063 | 0.722 | 1.9 | 31.1 | 11.18 | L15 |
| S114 | 40.121 | 8.932 | | | | |
| | | (Wide-angle End) 4.288 | | | | |
| | | (Middle End) 0.669 | | | | |
| | | (Telephoto End) | | | | |
| S115 | ∞ | −0.535 | | | | ST12 |
| S116 | 7.268 | 1.075 | 1.49 | 84.5 | 14.96 | L16 |
| S117 | ∞ | 0.453 | | | | |
| S118 | 6.612 | 2.303 | 1.49 | 84.5 | 7.52 | L17 |
| S119 | −7.242 | 0.203 | | | | |
| S120 | −7.554 | 0.474 | 1.8 | 25.5 | −63.45 | L18 |
| S121 | −9.123 | 0.476 | | | | |
| S122 | 33.133 | 0.432 | 1.85 | 40.4 | −10.08 | L19 |
| S123 | 6.776 | 5.211 | | | | |
| | | (Wide-angle End) 5.803 | | | | |
| | | (Middle End) 0.762 | | | | |
| | | (Telephoto End) | | | | |
| S124 | 47.033 | 1.000 | 1.54 | 56.1 | −15.09 | L110 |
| S125 | 6.830 | 3.652 | | | | |
| | | (Wide-angle End) 1.327 | | | | |
| | | (Middle End) 4.465 | | | | |
| | | (Telephoto End) | | | | |
| S126 | 9.808 | 1.250 | 1.62 | 25.9 | 25.26 | L111 |
| S127 | 25.488 | 0.845 | | | | |
| | | (Wide-angle End) 2.578 | | | | |
| | | (Middle End) 4.482 | | | | |
| | | (Telephoto End) | | | | |
| S128 | ∞ | 0.210 | 1.52 | 64.2 | | OF1 |
| S129 | ∞ | 1.000 | | | | |

The aspheric surface sag z of each aspheric lens in table 1 can be calculated by the following formula:

$$z = ch^2/\{1 + [1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the axis, k is conic constant and A, B, C, D, E, F and G are aspheric coefficients.

In the first embodiment, the conic constant k and the aspheric coefficients A, B, C, D, E, F, G of each aspheric lens are shown in Table 2.

TABLE 2

| Surface Number | k | A E | B F | C G | D |
|---|---|---|---|---|---|
| S17 | 0 | 7.15E−05 | 1.54E−06 | −6.15937E−08 | 6.18872E−10 |
| | | 8.13454E−11 | −6.04687E−12 | 1.31793E−13 | |
| S19 | 0 | 0.000435 | −1.92E−05 | 2.07761E−05 | −4.6815E−06 |
| | | 6.44788E−08 | 1.9072E−07 | −2.38845E−08 | |
| S113 | 0 | −4.98E−05 | 1.96E−06 | 2.02558E−07 | −8.796E−07 |
| | | −3.13598E−07 | −6.16445E−09 | 4.41308E−09 | |
| S114 | 0 | 0.000556 | 2.35E−05 | 1.56135E−07 | −9.07131E−07 |
| | | −1.32137E−07 | −4.7033E−08 | 6.54429E−09 | |
| S116 | 0 | −0.00014 | 1.25E−05 | −5.98813E−06 | 3.48377E−07 |
| | | 2.78766E−08 | −6.65173E−09 | 2.5121E−10 | |
| S118 | 0 | −0.000691 | −1.36E−05 | 2.13558E−06 | −1.53882E−07 |
| | | 4.56552E−08 | 2.10236E−09 | −4.2671E−11 | |
| S119 | 0 | 0.000191 | 3.06E−05 | 1.97305E−06 | −7.94152E−07 |
| | | 1.25327E−07 | 1.73554E−08 | −2.28176E−09 | |
| S121 | 0 | 0.000386 | −1.55E−05 | −8.70191E−06 | 9.24493E−07 |
| | | 0 | 0 | 0 | |
| S122 | 0 | −0.000603 | 7.7E−05 | −2.05218E−05 | −4.30081E−07 |
| | | 2.00857E−07 | 1.11599E−07 | −1.46052E−08 | |
| S124 | 0 | −0.001962 | 5.2E−05 | 0.000167839 | −3.58042E−05 |
| | | 1.34937E−06 | −4.83189E−07 | 9.38141E−08 | |
| S125 | 0 | −0.002313 | 0.000304 | −0.000135215 | 0.000108126 |
| | | −2.93511E−05 | 2.25638E−06 | 3.46292E−08 | |
| S126 | 0 | −0.002508 | −0.000213 | −7.1811E−06 | −3.1636E−06 |
| | | −1.09391E−07 | 1.75426E−07 | −1.18078E−08 | |
| S127 | 0 | −0.002675 | −0.000195 | −3.28272E−05 | 6.28998E−06 |
| | | −7.01173E−07 | 4.99686E−08 | 1.53888E−09 | |

Table 3 shows the parameters and condition values for conditions (1)-(10) in accordance with the lens assembly 1 of the first embodiment. It can be seen from Table 3 that the lens assembly 1 of the first embodiment satisfies the conditions (1)-(10). In order to achieve the preferred embodiment of the present invention, at least one of the conditions (1)-(10) is satisfied.

TABLE 3

| f1 | 21.20 mm | f2 | −7.22 mm | f3 | 8.61 mm |
|---|---|---|---|---|---|
| f4 | −15.09 mm | f5 | 25.26 mm | Dmax | 10.051 mm |
| D1r1 | 10.051 mm | | | | |
| f1/fW | 1.708 | f2/fW | −0.582 | f3/fW | 0.694 |
| f4/fW | −1.216 | f5/fW | 2.035 | TTL/fW | 3.244 |
| fT/TTL | 0.900 | TTL/Dmax | 4.005 | fT/D1r1 | 3.607 |

In addition, the lens assembly 1 of the first embodiment can meet the requirements of optical performance as seen in FIGS. 4A-4B and 5A-5B. It can be seen from FIG. 4A that the field curvature of tangential direction and sagittal direction in the lens assembly 1 of the first embodiment at the wide-angle end ranges from −0.08 mm to 0.05 mm. It can be seen from FIG. 4B that the distortion in the lens assembly 1 of the first embodiment at the wide-angle end ranges from 0% to 2%. It can be seen from FIG. 5A that the field curvature of tangential direction and sagittal direction in the lens assembly 1 of the first embodiment at the telephoto end ranges from −0.10 mm to 0.06 mm. It can be seen from FIG. 5B that the distortion in the lens assembly 1 of the first embodiment at the telephoto end ranges from 0% to 1%. In addition, the field curvature and distortion in the lens assembly 1 of the first embodiment at the middle end can also meet the requirements, and the figures are omitted here. It is obvious that the field curvature and the distortion of the lens assembly 1 of the first embodiment can be corrected effectively. Therefore, the lens assembly 1 of the first embodiment is capable of good optical performance.

Figure 7:
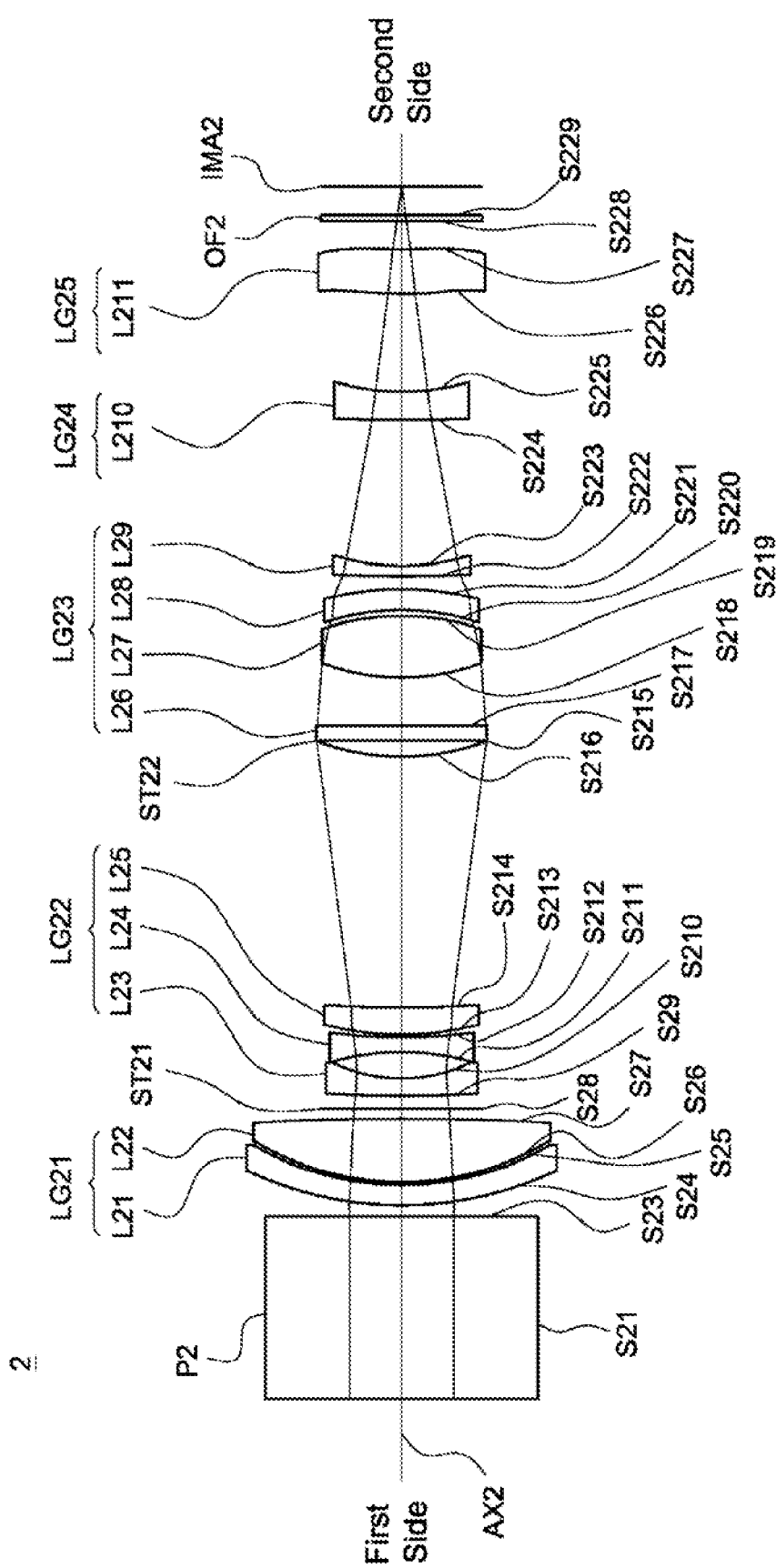
FIG. 7, FIG. 8, and FIG. 9 are lens layout diagrams of a lens assembly at the wide-angle end, the middle end, and the telephoto end in accordance with a second embodiment of the invention, respectively.
Figure 8:
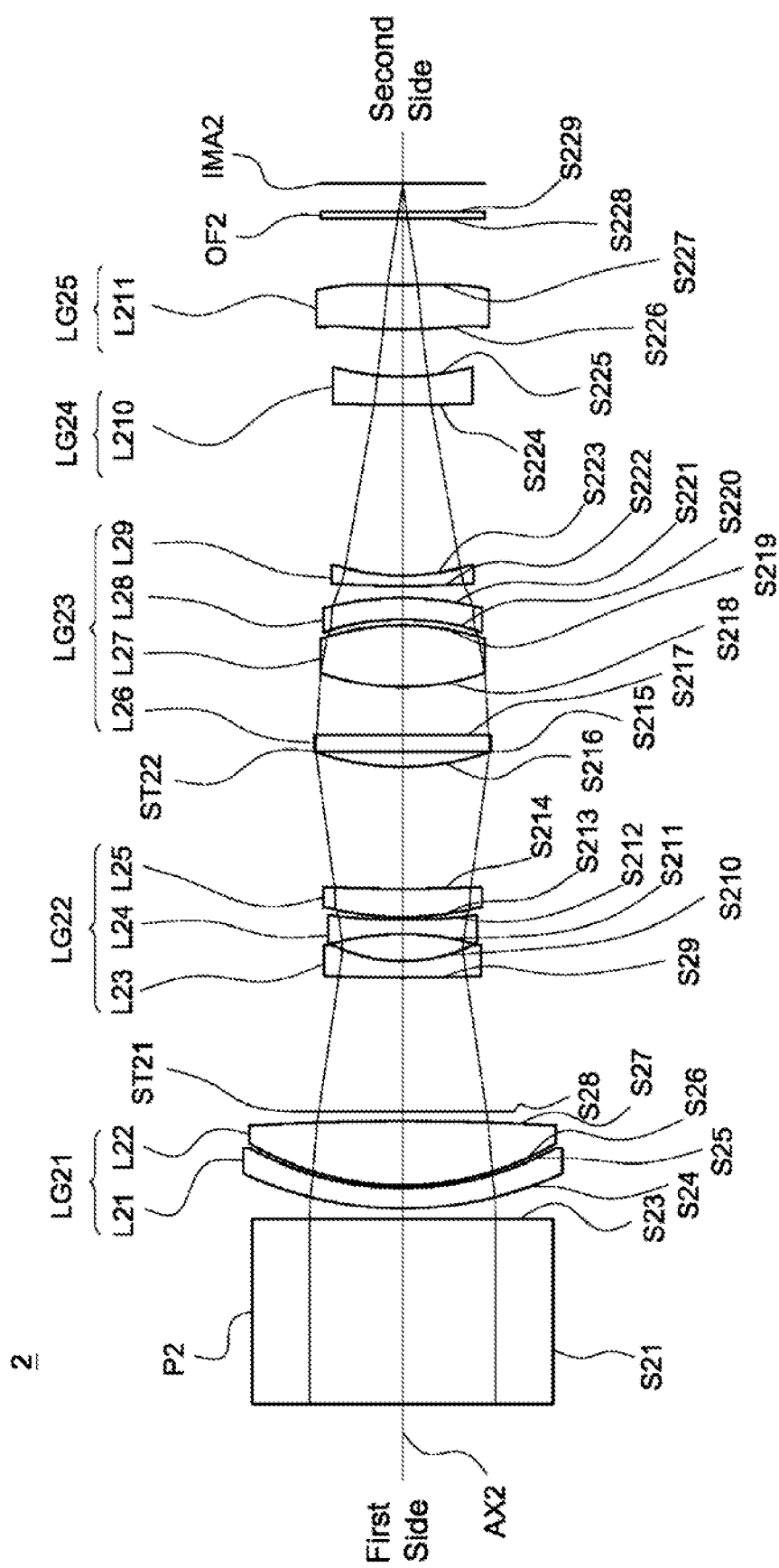
Figure 9:
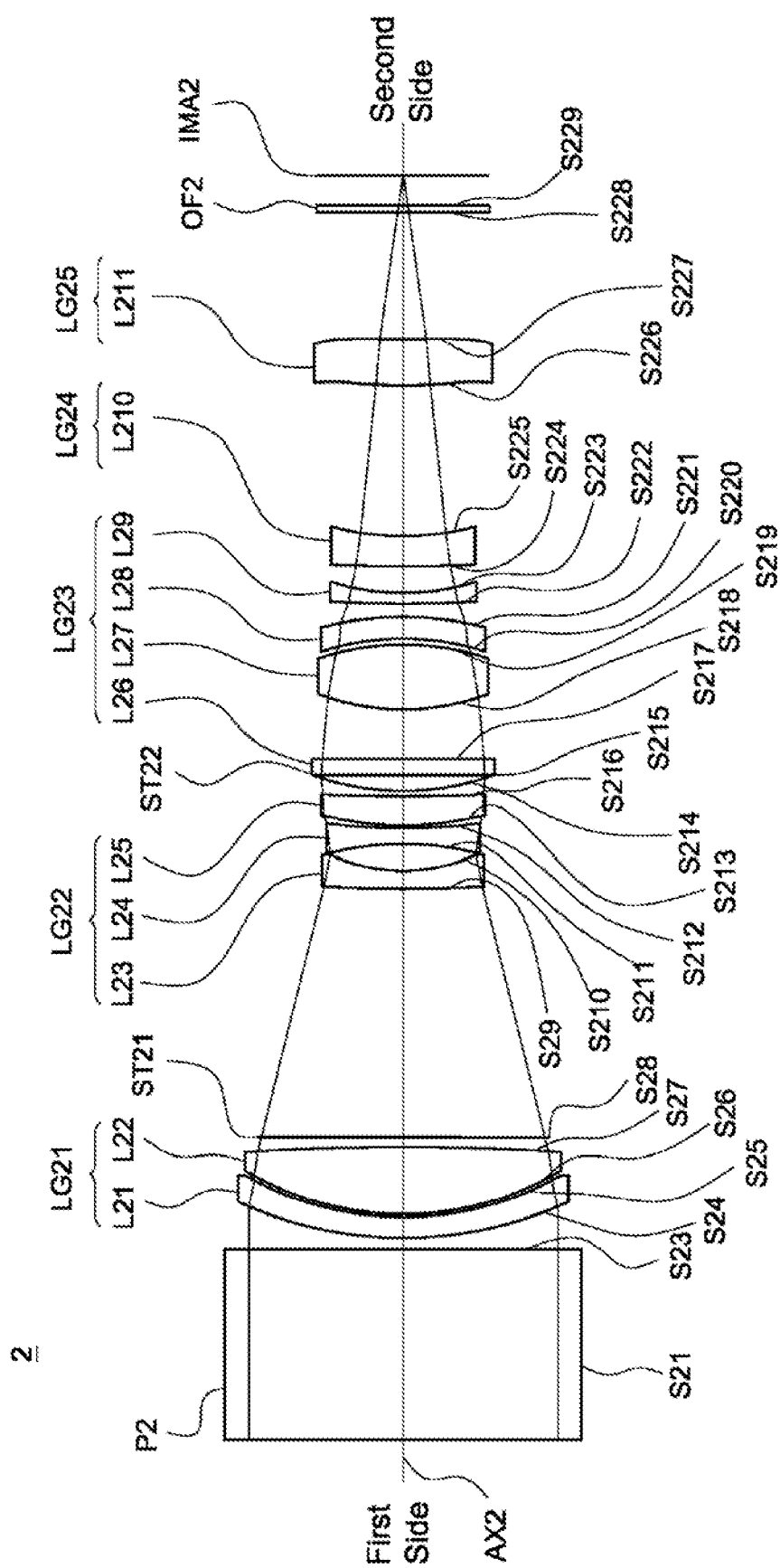
Figure 10A:
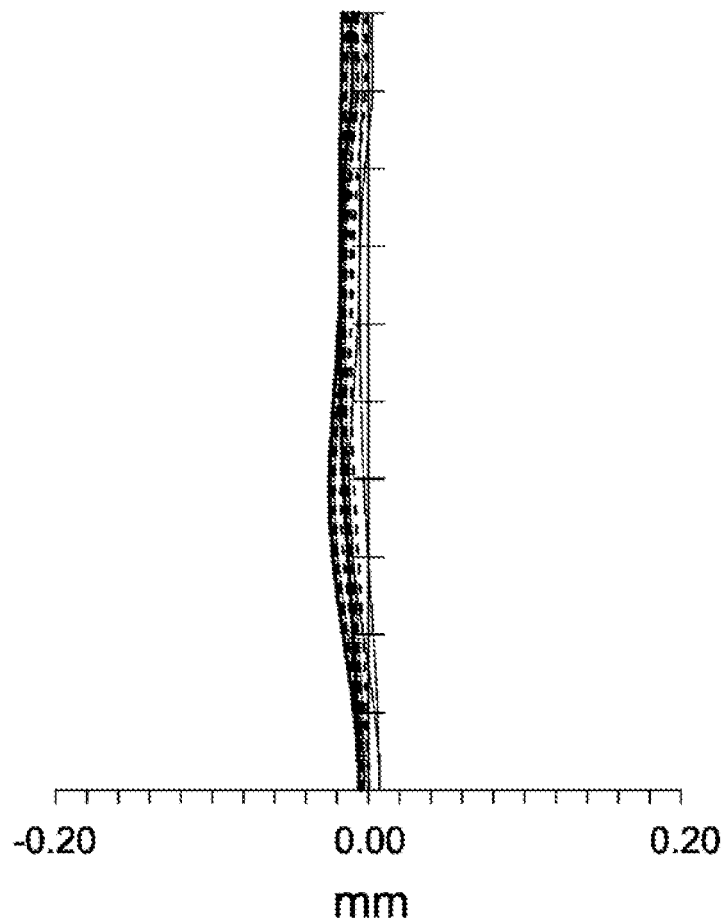
FIG. 10A and FIG. 10B depict a field curvature diagram and a distortion diagram of the lens assembly at the wide-angle end in accordance with the second embodiment of the invention, respectively.
Figure 10B:
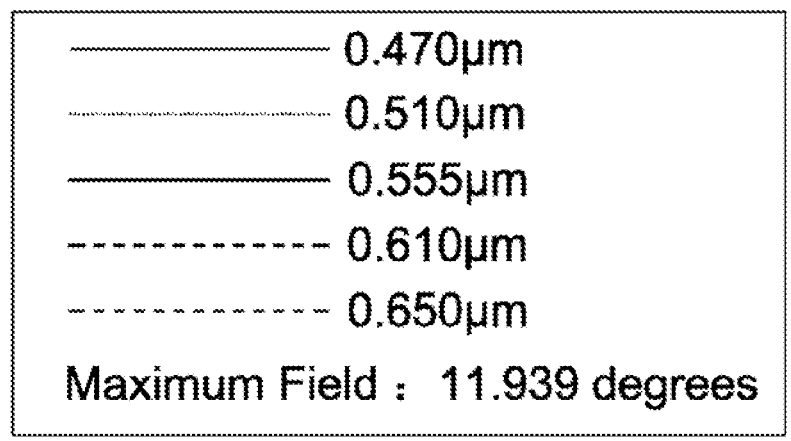
Figure 10B:
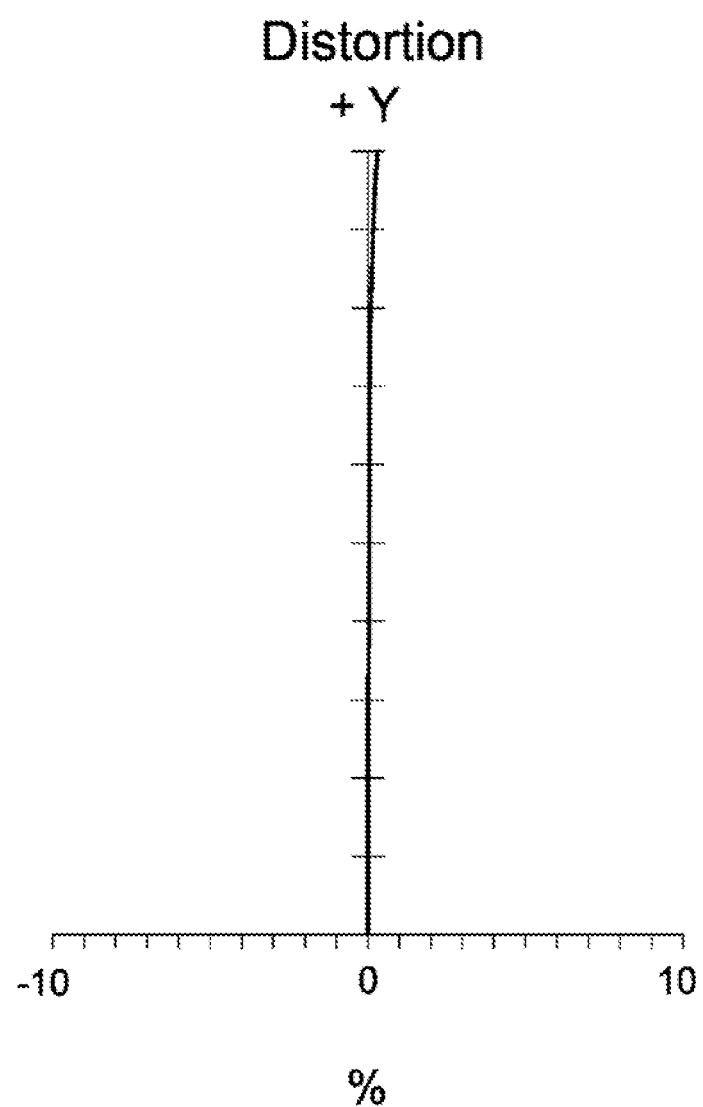
Figure 11A:
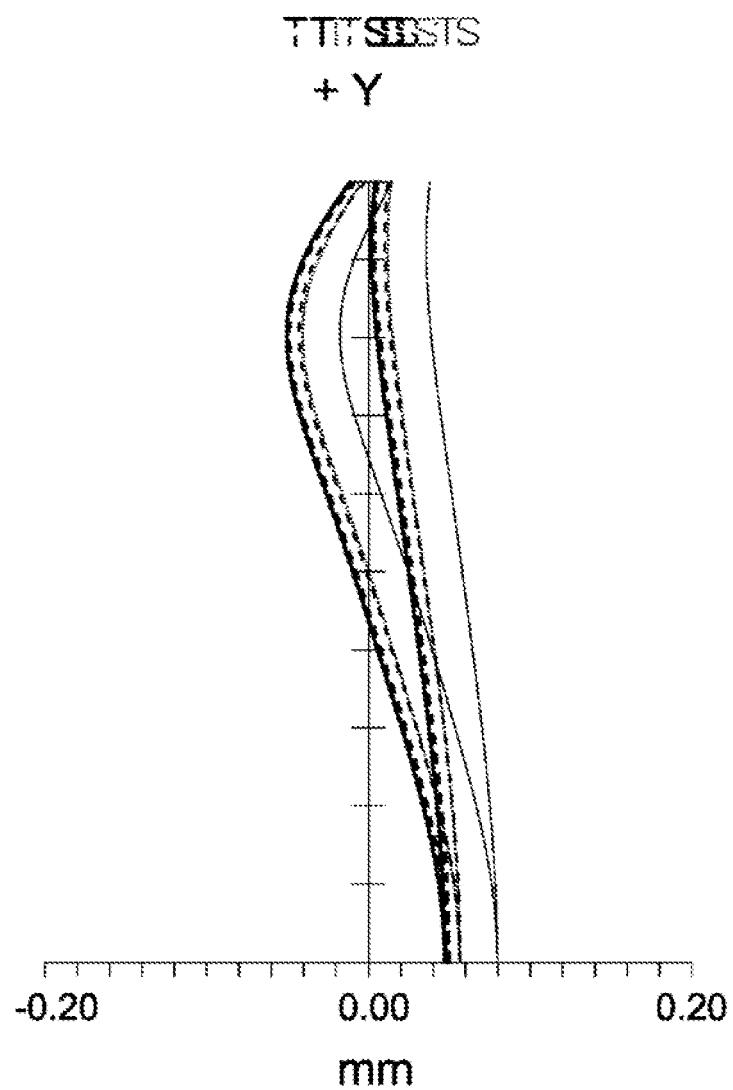
FIG. 11A and FIG. 11B depict a field curvature diagram and a distortion diagram of the lens assembly at the telephoto end in accordance with the second embodiment of the invention, respectively.
Figure 11B:
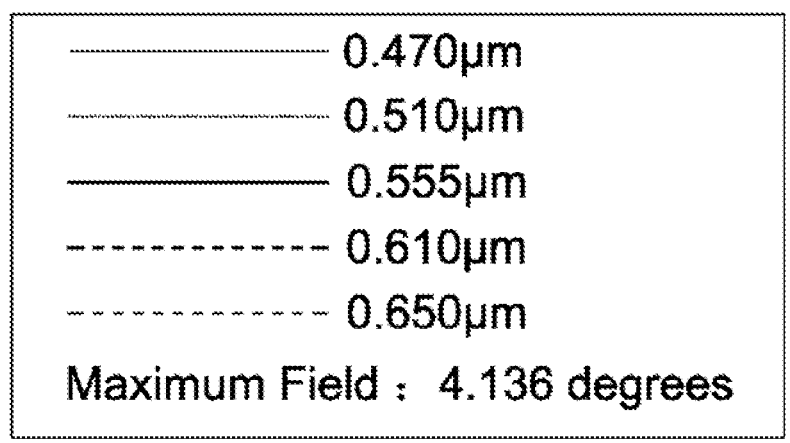
Figure 11B:
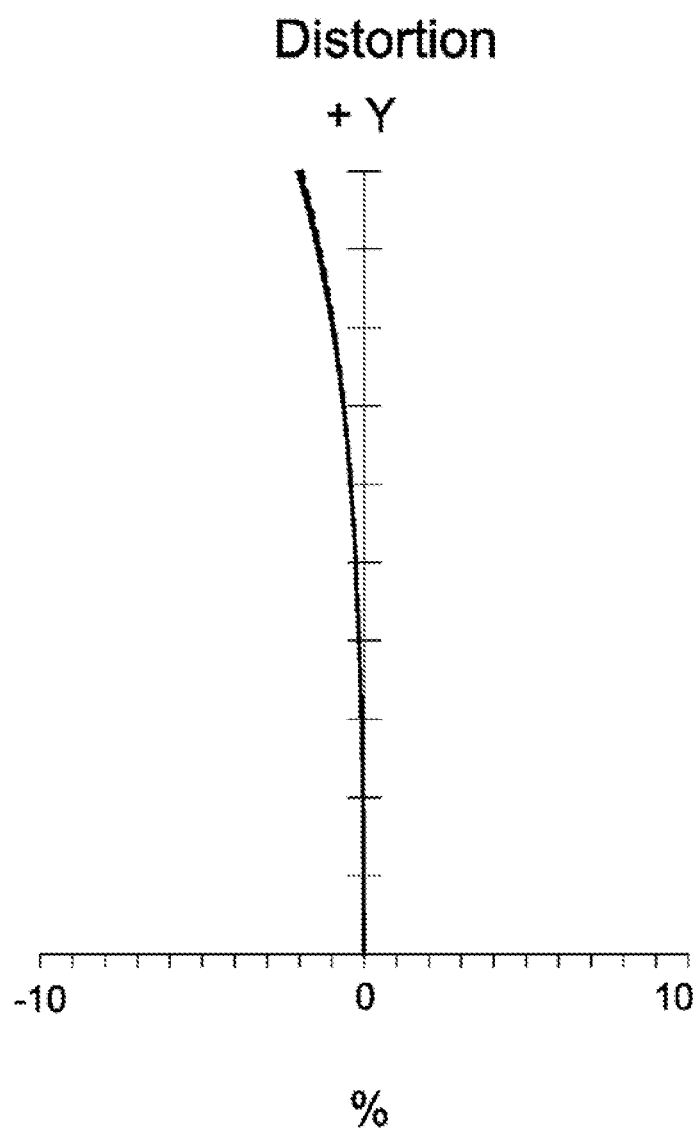

Referring to FIG. 7, FIG. 8, and FIG. 9, the lens assembly 2 includes a reflective element P2, a first lens group LG21, a shading element ST21, a second lens group LG22, a stop ST22, a third lens group LG23, a fourth lens group LG24, a fifth lens group LG25, and an optical filter OF2, all of which are arranged in order from a first side to a second side along an axis AX2. The first lens group LG21 includes a 1-1 lens L21 and a 1-2 lens L22, both of which are arranged in order from the first side to the second side along the axis AX2. The second lens group LG22 includes a 2-1 lens L23, a 2-2 lens L24, and a 2-3 lens L25, all of which are arranged in order from the first side to the second side along the axis AX2. The third lens group LG23 includes a 3-1 lens L26, a 3-2 lens L27, a 3-3 lens L28, and a 3-4 lens L29, all of which are arranged in order from the first side to the second side along the axis AX2. The fourth lens group LG24 includes a 4-1 lens L210. The fifth lens group LG25 includes a 5-1 lens L211. The incident surface S21 facing an object side (not shown) along the direction perpendicular to the axis. In operation, a light from the object side (not shown) incident on the reflective element P2 from the incident surface S21 first, then reflected by the reflective surface S22 (not shown) to change propagation direction, then sequentially passes through the exit surface S23, the first lens group LG21, the shading element ST21, the second lens group LG22, the stop ST22, the third lens group LG23, the fourth lens group LG24, the fifth lens group LG25, and the optical filter OF2, and finally imaged on an image plane IMA2. The image plane IMA2 is perpendicular to the incident surface S21 and parallel to the exit surface S23. In the second embodiment, the reflective element P2 is a prism and is not limited thereto.

The reflective element P2 can also be a mirror and only includes a reflective surface.

When the lens assembly 2 zooms from the wide-angle end (as shown in FIG. 7) to the middle end (as shown in FIG. 8), the first lens group LG21 is fixed, the second lens group LG22 moves to the second side along the axis AX2, the third lens group LG23 is fixed, the fourth lens group LG24 moves to the second side along the axis AX2, and the fifth lens group LG25 moves to the first side along the axis AX2, so that the interval between the first lens group LG21 and the second lens group LG22 is increased, the interval between the second lens group LG22 and the third lens group LG23 is decreased, the interval between the third lens group LG23 and the fourth lens group LG24 is increased, the interval between the fourth lens group LG24 and the fifth lens group LG25 is decreased, and the interval between the fifth lens group LG25 and the optical filter OF2 is increased. When the lens assembly 2 zooms from the middle end (as shown in FIG. 8) to the telephoto end (as shown in FIG. 9), the first lens group LG21 is fixed, the second lens group LG22 moves to the second side along the axis AX2, the third lens group LG23 is fixed, the fourth lens group LG24 moves to the first side along the axis AX2, and the fifth lens group LG25 moves to the first side along the axis AX2, so that the interval between the first lens group LG21 and the second lens group LG22 is increased, the interval between the second lens group LG22 and the third lens group LG23 is decreased, the interval between the third lens group LG23 and the fourth lens group LG24 is decreased, the interval between the fourth lens group LG24 and the fifth lens group LG25 is increased, and the interval between the fifth lens group LG25 and the optical filter OF2 is increased. The zoom magnification is approximately 3.00 times (37.20 mm/12.39 mm≈3.0) as the lens assembly 2 of the second embodiment zooms from the wide-angle end (as shown in FIG. 7) to the telephoto end (as shown in FIG. 9).

The shading element ST21 includes a variable hole (not shown) and the variable hole (not shown) can be changed in dimension by a driving element (not shown) driving the mechanism to achieve multi-stage changes in hole size. When the lens assembly 2 zooms from the wide-angle end (as shown in FIG. 7) to the middle end (as shown in FIG. 8) and from the middle end (as shown in FIG. 8) to the telephoto end (as shown in FIG. 9), the variable hole (not shown) of the shading element ST21 will change according to the effective focal length of the lens assembly 2. The correspondingly change in the size of the variable hole leads to change f-Number.

Among the first lens group LG21, the second lens group LG22, the third lens group LG23, the fourth lens group LG24, and the fifth lens group LG25, the effective optical range is non-circular symmetry for at least one lens, so that the effective optical diameter of the short side direction is different from the effective optical diameter of the long side direction. When the lens assembly 2 is at the telephoto end, the schematic diagram of the effective optical diameter of the lens in the short side direction and long side direction is similar to FIG. 6.

The 3-2 lens L27 and the 3-3 lens L28 of the third lens group LG23 can move perpendicular to the axis AX2 to achieve optical image stabilization. The fourth lens group LG24 can move along the axis AX2 to achieve auto focus.

According to the foregoing, wherein: the first side surface S24 of the 1-1 lens L21 is a convex surface and the second side surface S25 of the 1-1 lens L21 is a concave surface; the 2-3 lens L25 is a meniscus lens, wherein the second side surface S214 is a concave surface; the first side surface S224 of the 4-1 lens L210 is a convex surface and the second side surface S225 of the 4-1 lens L210 is a concave surface; the first side surface S226 of the 5-1 lens L211 is a convex surface and the second side surface S227 of the 5-1 lens L211 is a concave surface; and both of the first side surface S228 and second side surface S229 of the optical filter OF2 are plane surfaces.

With the above design of the lenses, reflective element P2, shading element ST21, stop ST22, and at least one of the conditions (1)-(10) satisfied, the lens assembly 2 can have an effective shortened total lens length, an effective decreased thickness, an effective increased resolution, an effective increased brightness uniformity, an effective corrected aberration, an effective corrected chromatic aberration, and a realized optical zoom function. The preferred embodiment of the present invention can be achieved when the lens assembly satisfies conditions (1)-(10), refractive power distribution, and surface shape.

Table 4 shows the optical specification of the lens assembly 2 in FIG. 7, FIG. 8, and FIG. 9 when the lens assembly 2 is at the wide-angle end, middle end, and telephoto end, respectively.

TABLE 4

| | | |
|---|---|---|
| Wide-angle End | Effective Focal Length = 12.39 mm | F-number = 3.60 |
| | Total Lens Length = 42.41 mm | Field of View = 23.878 degrees |
| Middle End | Effective Focal Length = 21.44 mm | F-number = 3.63 |
| | Total Lens Length = 42.41 mm | Field of View = 14.102 degrees |
| Telephoto End | Effective Focal Length = 37.20 mm | F-number = 3.92 |
| | Total Lens Length = 42.41 mm | Field of View = 8.272 degrees |

| Surface Number | Radius of Curvature (mm) | Thickness (mm) | Nd | Vd | Effective Focal Length (mm) | Remark |
|---|---|---|---|---|---|---|
| S21 | ∞ | 3.2 | 1.52 | 64.1 | | P2 |
| S22 | ∞ | 3.2 | 1.52 | 64.1 | | |
| S23 | ∞ | 0.4 | | | | |

TABLE 4-continued

| Surface Number | Radius of Curvature (mm) | Thickness (mm) | Nd | Vd | Effective Focal Length (mm) | Remark |
|---|---|---|---|---|---|---|
| S24 | 11.348 | 0.7 | 1.85 | 23.8 | −67.9 | L21 |
| S25 | 9.221 | 0.099 | | | | |
| S26 | 8.915 | 2.248 | 1.49 | 84.5 | 15.94 | L22 |
| S27 | −55.675 | 0.328 | | | | |
| S28 | ∞ | 0.446 | | | | ST21 |
| | | (Wide-angle End) | | | | |
| | | 4.626 | | | | |
| | | (Middle End) | | | | |
| | | 8.334 | | | | |
| | | (Telephoto End) | | | | |
| S29 | 64.663 | 0.6 | 1.49 | 84.5 | −10.75 | L23 |
| S210 | 4.836 | 0.930 | | | | |
| S211 | −8.029 | 0.5 | 1.74 | 49.3 | −7.33 | L24 |
| S212 | 17.560 | 0.086 | | | | |
| S213 | 8.548 | 0.986 | 1.89 | 31 | 10.79 | L25 |
| S214 | 68.239 | 9.299 | | | | |
| | | (Wide-angle End) | | | | |
| | | 4.776 | | | | |
| | | (Middle End) | | | | |
| | | 0.696 | | | | |
| | | (Telephoto End) | | | | |
| S215 | ∞ | −0.535 | | | | ST22 |
| S216 | 7.399 | 1.084 | 1.49 | 84.5 | 15.17 | L26 |
| S217 | ∞ | 1.673 | | | | |
| S218 | 6.655 | 2.163 | 1.49 | 84.5 | 7.53 | L27 |
| S219 | −7.323 | 0.200 | | | | |
| S220 | −7.570 | 0.734 | 1.8 | 25.5 | −57.06 | L28 |
| S221 | −9.449 | 0.447 | | | | |
| S222 | 31.793 | 0.361 | 1.85 | 40.4 | −10.52 | L29 |
| S223 | 6.994 | 5.105 | | | | |
| | | (Wide-angle End) | | | | |
| | | 5.906 | | | | |
| | | (Middle End) | | | | |
| | | 0.898 | | | | |
| | | (Telephoto End) | | | | |
| S224 | 42.545 | 1 | 1.54 | 56.1 | −17.21 | L210 |
| S225 | 7.529 | 3.413 | | | | |
| | | (Wide-angle End) | | | | |
| | | 1.620 | | | | |
| | | (Middle End) | | | | |
| | | 5.064 | | | | |
| | | (Telephoto End) | | | | |
| S226 | 12.444 | 1.550 | 1.62 | 25.9 | 27.67 | L211 |
| S227 | 43.275 | 0.979 | | | | |
| | | (Wide-angle End) | | | | |
| | | 2.314 | | | | |
| | | (Middle End) | | | | |
| | | 4.249 | | | | |
| | | (Telephoto End) | | | | |
| S228 | ∞ | 0.21 | 1.52 | 64.2 | | OF2 |
| S229 | ∞ | 1.000 | | | | |

The definition of aspheric surface sag z of each aspheric lens in table 4 is the same as that of in Table 1, and is not described here again. In the second embodiment, the conic constant k and the aspheric coefficients A, B, C, D, E, F, G of each aspheric lens are shown in Table 5.

TABLE 5

| Surface Number | k | A<br>E | B<br>F | C<br>G | D |
|---|---|---|---|---|---|
| S27 | 0 | 6.45E−05<br>9.13163E−11 | 9.1324E−07<br>−4.73846E−12 | −6.3059E−08<br>7.03331E−14 | 9.00421E−10 |
| S29 | 0 | 0.000456<br>−1.47185E−07 | −5.12612E−05<br>1.14311E−07 | 2.67831E−05<br>−8.79275E−09 | −3.91274E−06 |
| S213 | 0 | 3.36E−05<br>−1.42594E−07 | 9.65565E−06<br>3.83919E−09 | −1.5425E−06<br>−2.24343E−10 | −7.79215E−07 |
| S214 | 0 | 0.000494<br>1.35433E−08 | 3.5816E−05<br>−3.26754E−08 | −3.79677E−06<br>2.36278E−09 | −5.27769E−07 |
| S216 | 0 | −0.00013<br>2.66469E−08 | −5.83733E−06<br>−1.05443E−08 | −3.6559E−06<br>5.67945E−10 | 5.00927E−07 |
| S218 | 0 | −0.00072<br>1.95523E−08 | 8.67169E−06<br>6.37337E−09 | 1.82049E−06<br>−6.20868E−11 | −6.36512E−07 |
| S219 | 0 | 0.000212<br>7.88567E−08 | 2.74528E−05<br>8.35236E−09 | 2.05356E−06<br>−6.03845E−10 | −7.83887E−07 |
| S221 | 0 | 0.000185<br>0 | −9.37837E−06<br>0 | −6.7203E−06<br>0 | 6.4185E−07 |
| S222 | 0 | −0.00048<br>−7.25898E−08 | 2.07229E−05<br>5.08508E−08 | −1.23259E−05<br>−4.88141E−09 | 1.17469E−06 |
| S224 | 0 | −0.0001<br>5.41799E−06 | −0.000119372<br>−1.45479E−07 | 9.79404E−05<br>−2.8234E−08 | −3.84524E−05 |
| S225 | 0 | −0.00032<br>−2.36046E−05 | 0.00043514<br>3.06054E−06 | −0.000283513<br>−1.73027E−07 | 0.000100629 |
| S226 | 0 | −0.00246<br>−4.67764E−07 | −2.49098E−05<br>9.31335E−08 | −5.92326E−06<br>−8.29703E−10 | −3.9626E−06 |
| S227 | 0 | −0.00329<br>−7.84039E−07 | 3.40461E−05<br>6.797E−08 | −3.82429E−05<br>−5.43687E−10 | 4.11113E−06 |

Table 6 shows the parameters and condition values for conditions (1)-(10) in accordance with the lens assembly 2 of the second embodiment. It can be seen from Table 6 that the lens assembly 2 of the second embodiment satisfies the conditions (1)-(10). In order to achieve the preferred embodiment of the present invention, at least one of the conditions (1)-(10) is satisfied.

TABLE 6

| f1 | 21.49 mm | f2 |  | −7.34 mm | f3 | 9.12 mm |
|---|---|---|---|---|---|---|
| f4 | −17.21 mm | f5 |  | 27.67 mm | Dmax | 10.183 mm |
| D1r1 | 10.183 mm | | | | | |
| f1/fW | 1.734 | f2/fW |  | −0.592 | f3/fW | 0.736 |
| f4/fW | −1.389 | f5/fW |  | 2.233 | TTL/fW | 3.423 |
| fT/TTL | 0.877 | TTL/Dmax |  | 4.165 | fT/D1r1 | 3.653 |

In addition, the lens assembly 2 of the second embodiment can meet the requirements of optical performance as seen in FIGS. 10A-10B and 11A-11B. It can be seen from FIG. 10A that the field curvature of tangential direction and sagittal direction in the lens assembly 2 of the second embodiment at the wide-angle end ranges from −0.04 mm to 0.02 mm. It can be seen from FIG. 10B that the distortion in the lens assembly 2 of the second embodiment at the wide-angle end ranges from 0% to 1%. It can be seen from FIG. 11A that the field curvature of tangential direction and sagittal direction in the lens assembly 2 of the second embodiment at the telephoto end ranges from −0.06 mm to 0.08 mm. It can be seen from FIG. 11B that the distortion in the lens assembly 2 of the second embodiment at the telephoto end ranges from −2% to 0%. In addition, the field curvature and distortion in the lens assembly 2 of the second embodiment at the middle end can also meet the requirements, and the figures are omitted here. It is obvious that the field curvature and the distortion of the lens assembly 2 of the second embodiment can be corrected effectively. Therefore, the lens assembly 2 of the second embodiment is capable of good optical performance.

Figure 12:
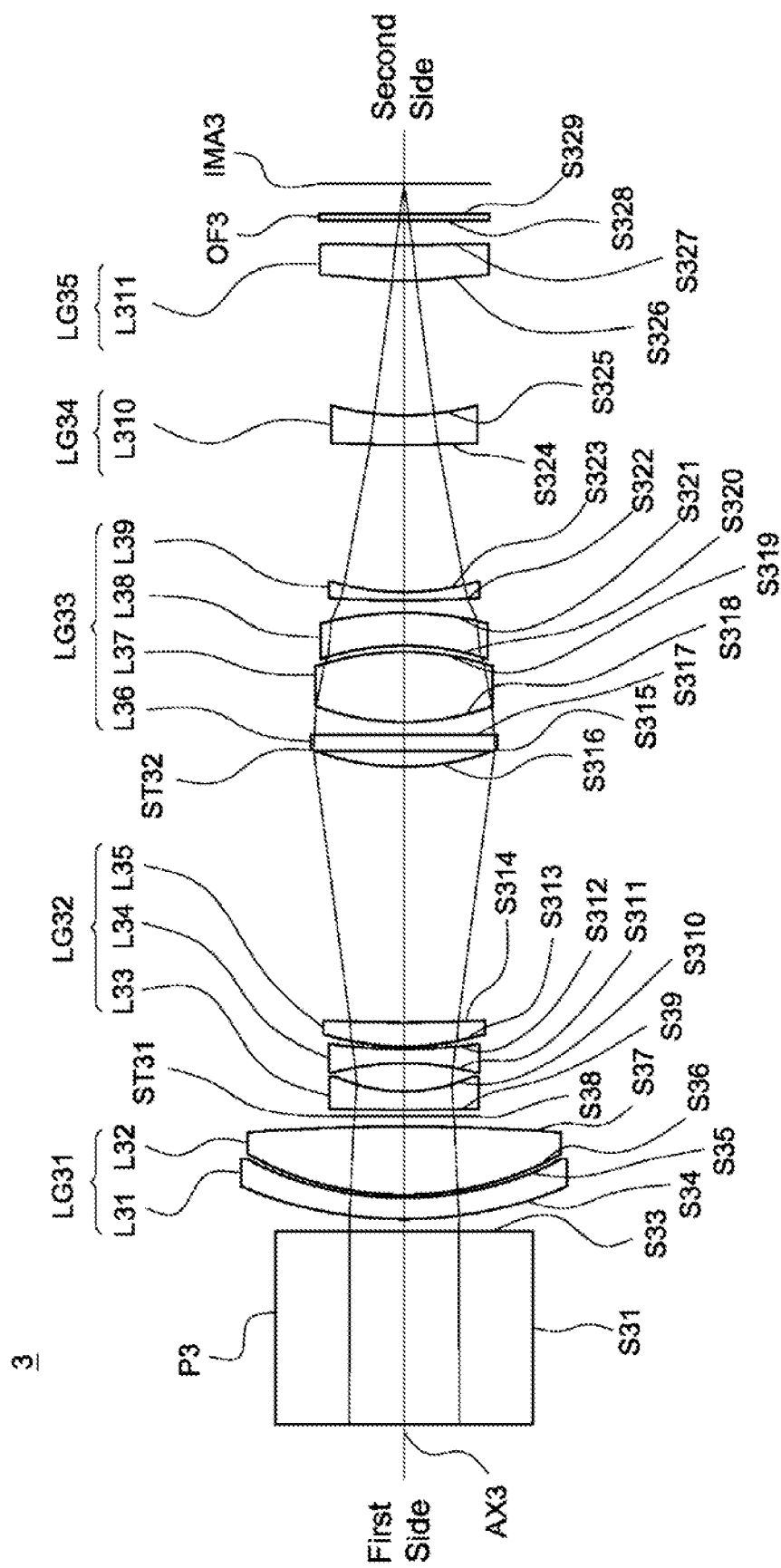
FIG. 12, FIG. 13, and FIG. 14 are lens layout diagrams of a lens assembly at the wide-angle end, the middle end, and the telephoto end in accordance with a third embodiment of the invention, respectively.
Figure 13:
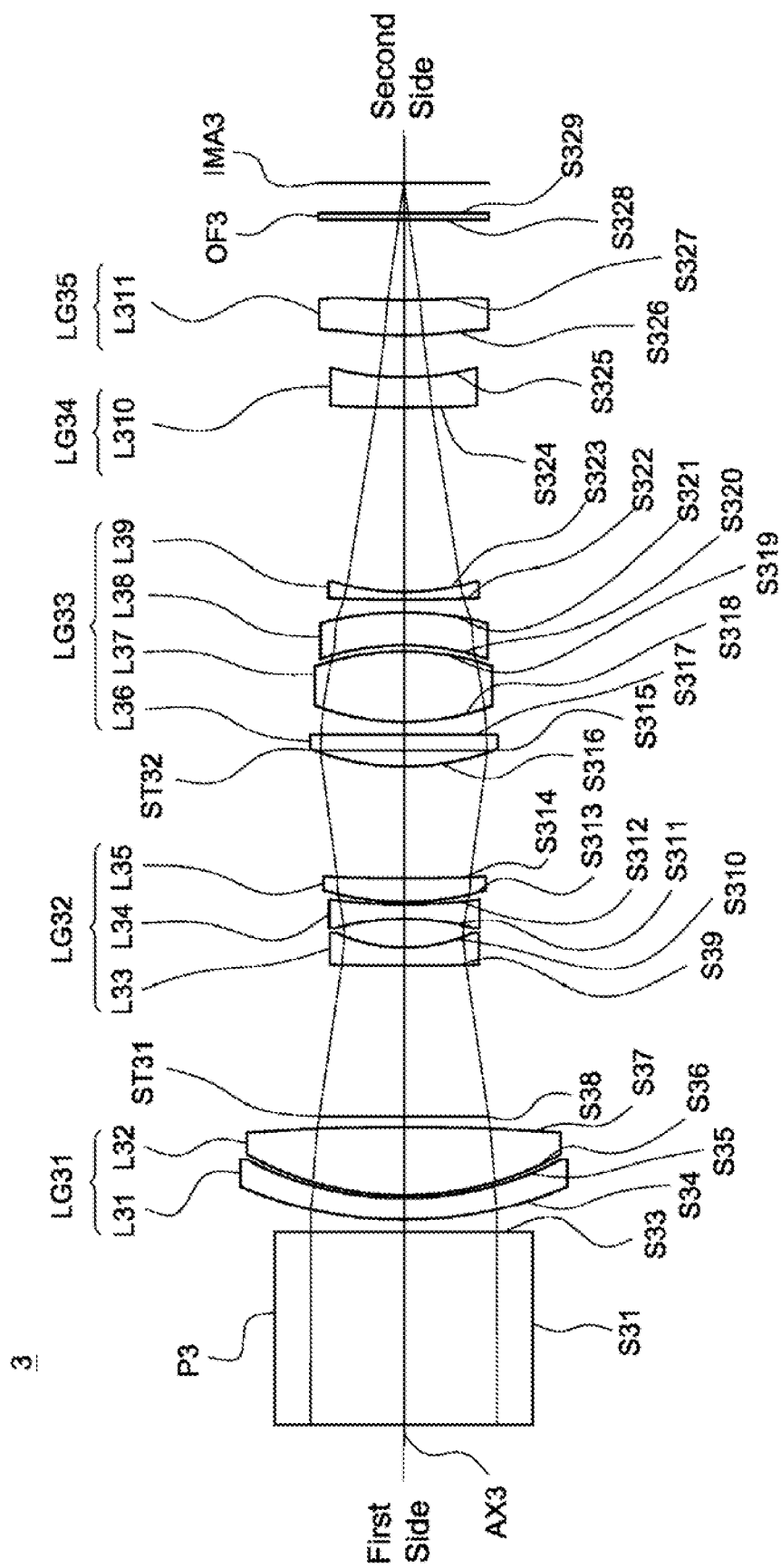
Figure 14:
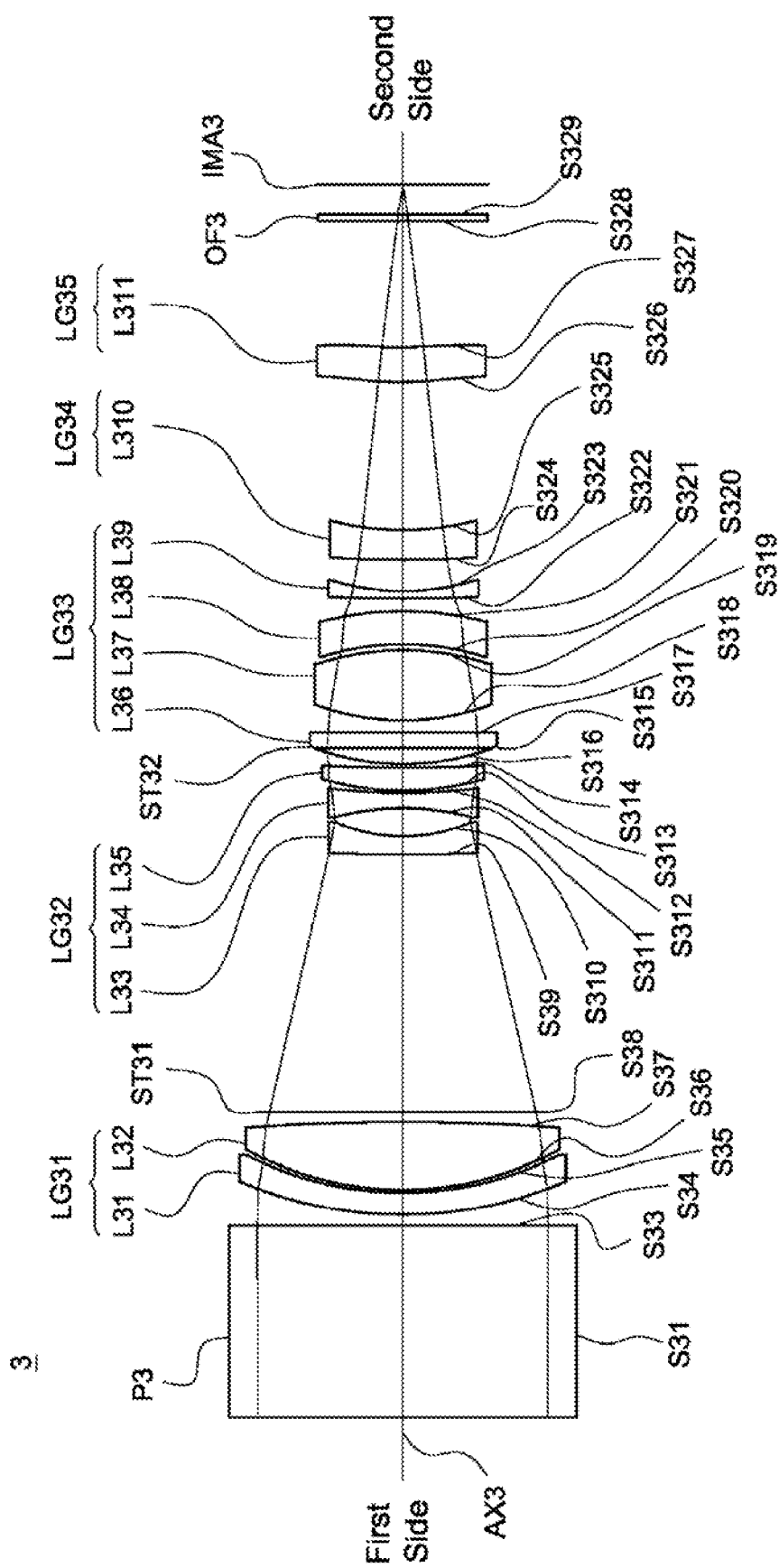
Figure 15A:
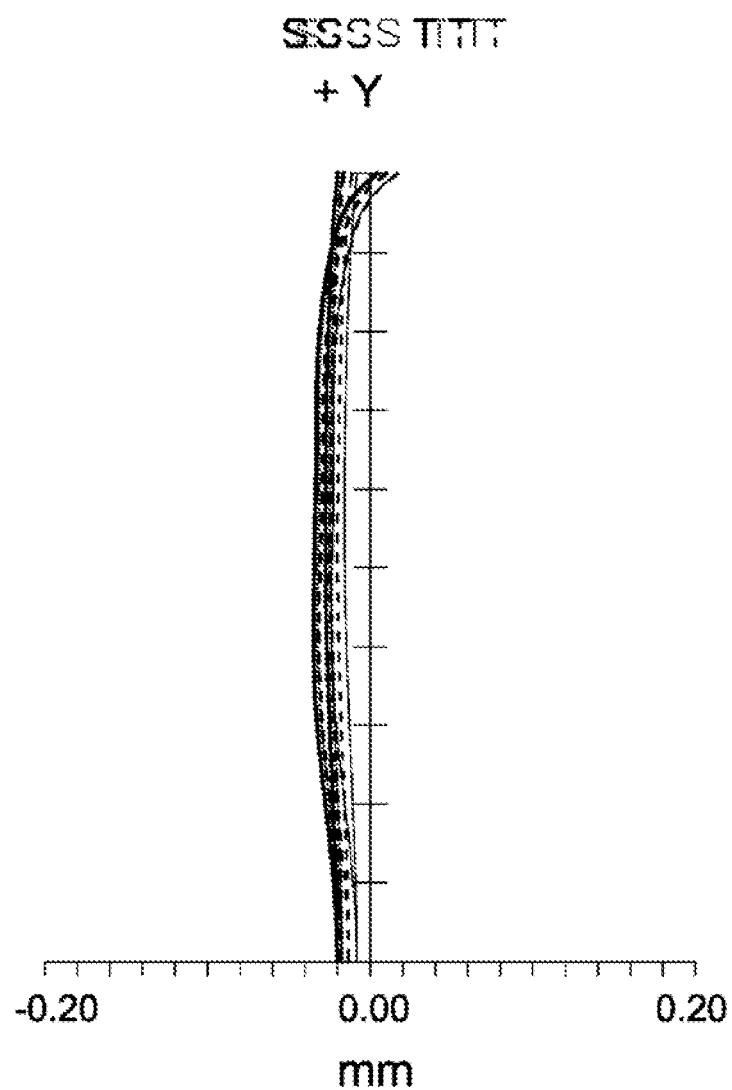
FIG. 15A and FIG. 15B depict a field curvature diagram and a distortion diagram of the lens assembly at the wide-angle end in accordance with the third embodiment of the invention, respectively.
Figure 15B:
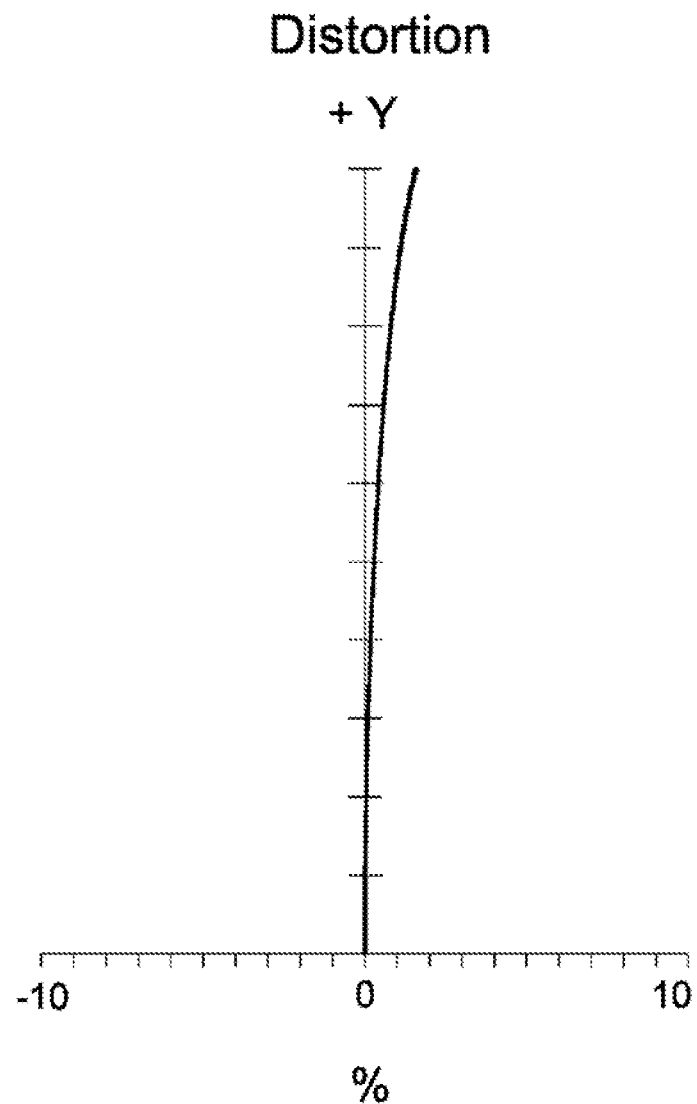
Figure 16A:
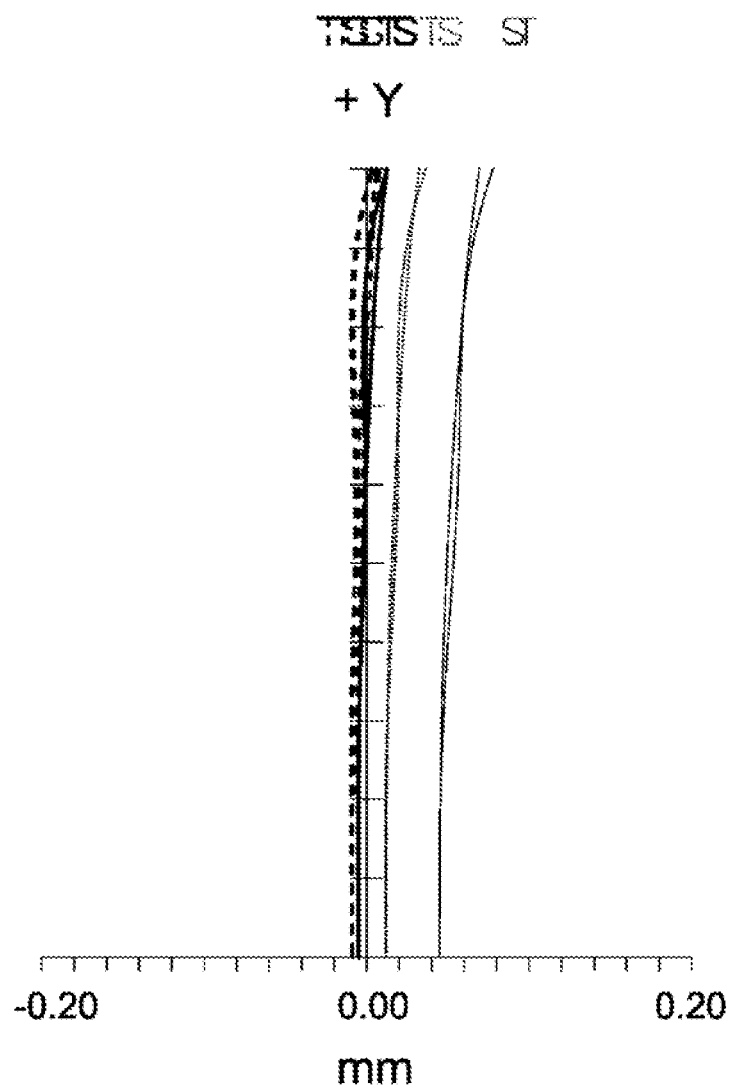
FIG. 16A and FIG. 16B depict a field curvature diagram and a distortion diagram of the lens assembly at the telephoto end in accordance with the third embodiment of the invention, respectively.
Figure 16B:
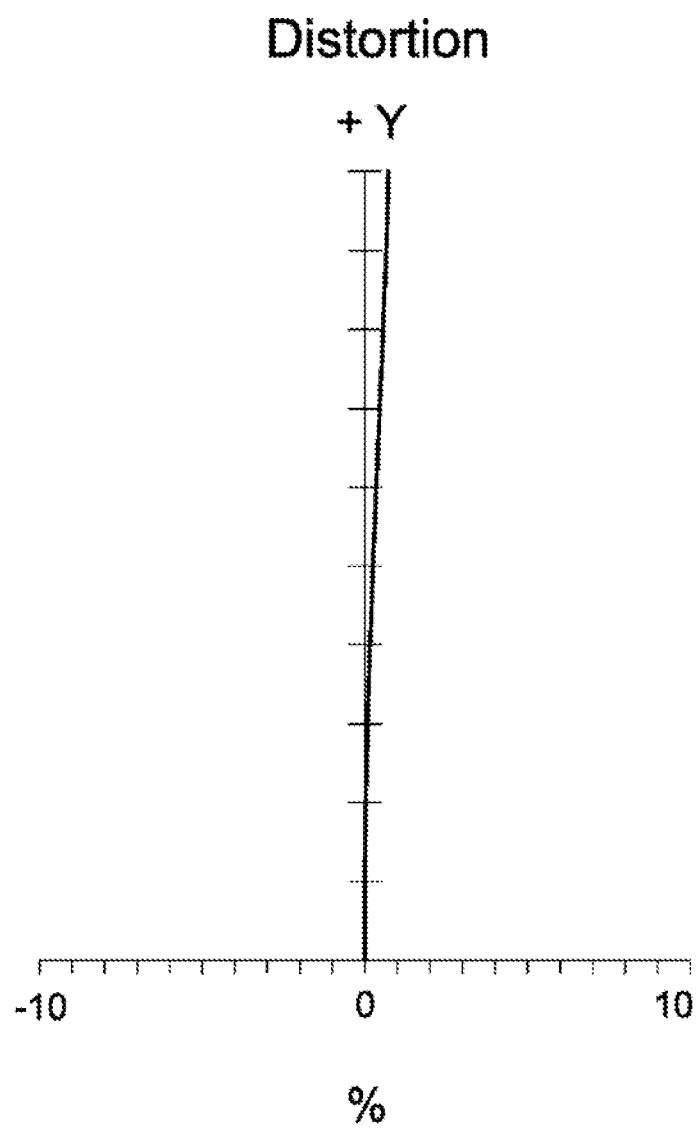

Referring to FIG. 12, FIG. 13, and FIG. 14, the lens assembly 3 includes a reflective element P3, a first lens group LG31, a shading element ST31, a second lens group LG32, a stop ST32, a third lens group LG33, a fourth lens group LG34, a fifth lens group LG35, and an optical filter OF3, all of which are arranged in order from a first side to a second side along an axis AX3. The first lens group LG31 includes a 1-1 lens L31 and a 1-2 lens L32, both of which are arranged in order from the first side to the second side along the axis AX3. The second lens group LG32 includes a 2-1 lens L33, a 2-2 lens L34, and a 2-3 lens L35, all of which are arranged in order from the first side to the second side along the axis AX3. The third lens group LG33 includes a 3-1 lens L36, a 3-2 lens L37, a 3-3 lens L38, and a 3-4 lens L39, all of which are arranged in order from the first side to the second side along the axis AX3. The fourth lens group LG34 includes a 4-1 lens L310. The fifth lens group LG35 includes a 5-1 lens L311. The incident surface S31 facing an object side (not shown) along the direction perpendicular to the axis. In operation, a light from the object side (not shown) incident on the reflective element P3 from the incident surface S31 first, then reflected by the reflective surface S32 (not shown) to change propagation direction, then sequentially passes through the exit surface S33, the first lens group LG31, the shading element ST31, the second lens group LG32, the stop ST32, the third lens group LG33, the fourth lens group LG34, the fifth lens group LG35, and the optical filter OF3, and finally imaged on an image plane IMA3. The image plane IMA3 is perpendicular to the incident surface S31 and parallel to the exit surface S33. In the third embodiment, the reflective element P3 is a prism and is not limited thereto. The reflective element P3 can also be a mirror and only includes a reflective surface.

When the lens assembly 3 zooms from the wide-angle end (as shown in FIG. 12) to the middle end (as shown in FIG. 13), the first lens group LG31 is fixed, the second lens group LG32 moves to the second side along the axis AX3, the third lens group LG33 is fixed, the fourth lens group LG34 moves to the second side along the axis AX3, and the fifth lens group LG35 moves to the first side along the axis AX3, so that the interval between the first lens group LG31 and the second lens group LG32 is increased, the interval between the second lens group LG32 and the third lens group LG33 is decreased, the interval between the third lens group LG33 and the fourth lens group LG34 is increased, the interval between the fourth lens group LG34 and the fifth lens group LG35 is decreased, and the interval between the fifth lens group LG35 and the optical filter OF3 is increased. When the lens assembly 3 zooms from the middle end (as shown in FIG. 13) to the telephoto end (as shown in FIG. 14), the first lens group LG31 is fixed, the second lens group LG32 moves to the second side along the axis AX3, the third lens group LG33 is fixed, the fourth lens group LG34 moves to the first side along the axis AX3, and the fifth lens group LG35 moves to the first side along the axis AX3, so that the interval between the first lens group LG31 and the second lens group LG32 is increased, the interval between the second lens group LG32 and the third lens group LG33 is decreased, the interval between the third lens group LG33 and the fourth lens group LG34 is decreased, the interval between the fourth lens group LG34 and the fifth lens group LG35 is increased, and the interval between the fifth lens group LG35 and the optical filter OF3 is increased. The zoom magnification is approximately 2.976 times (36.84 mm/12.38 mm≈2.976) as the lens assembly 3 of the third embodiment zooms from the wide-angle end (as shown in FIG. 12) to the telephoto end (as shown in FIG. 14).

The shading element ST31 includes a variable hole (not shown) and the variable hole (not shown) can be changed in dimension by a driving element (not shown) driving the mechanism to achieve multi-stage changes in hole size. When the lens assembly 3 zooms from the wide-angle end (as shown in FIG. 12) to the middle end (as shown in FIG. 13) and from the middle end (as shown in FIG. 13) to the telephoto end (as shown in FIG. 14), the variable hole (not shown) of the shading element ST31 will change according to the effective focal length of the lens assembly 3. The correspondingly change in the size of the variable hole leads to change f-Number.

Among the first lens group LG31, the second lens group LG32, the third lens group LG33, the fourth lens group LG34, and the fifth lens group LG35, the effective optical range is non-circular symmetry for at least one lens, so that the effective optical diameter of the short side direction is different from the effective optical diameter of the long side direction. When the lens assembly 3 is at the telephoto end, the schematic diagram of the effective optical diameter in the short side direction and long side direction is similar to FIG. 6.

The 3-2 lens L37 and the 3-3 lens L38 of the third lens group LG33 can move perpendicular to the axis AX3 to achieve optical image stabilization. The fourth lens group LG34 can move along the axis AX3 to achieve auto focus.

According to the foregoing, wherein: the first side surface S34 of the 1-1 lens L31 is a convex surface and the second side surface S35 of the 1-1 lens L31 is a concave surface; the 2-3 lens L35 is a meniscus lens, wherein the second side surface S314 is a concave surface; the first side surface S324 of the 4-1 lens L310 is a convex surface and the second side surface S325 of the 4-1 lens L310 is a concave surface; the first side surface S326 of the 5-1 lens L311 is a convex surface and the second side surface S327 of the 5-1 lens L311 is a concave surface; and both of the first side surface S328 and second side surface S329 of the optical filter OF3 are plane surfaces.

With the above design of the lenses, reflective element P3, shading element ST31, stop ST32, and at least one of the conditions (1)-(10) satisfied, the lens assembly 3 can have an effective shortened total lens length, an effective decreased thickness, an effective increased resolution, an effective increased brightness uniformity, an effective corrected aberration, an effective corrected chromatic aberration, and a realized optical zoom function. The preferred embodiment of the present invention can be achieved when the lens assembly satisfies conditions (1)-(10), refractive power distribution, and surface shape.

Table 7 shows the optical specification of the lens assembly 3 in FIG. 12, FIG. 13, and FIG. 14 when the lens assembly 3 is at the wide-angle end, middle end, and telephoto end, respectively.

TABLE 7

| Wide-angle End | Effective Focal Length = 12.38 mm | F-number = 3.67 |
| --- | --- | --- |
| | Total Lens Length = 41.16 mm | Field of View = 23.584 degrees |
| Middle End | Effective Focal Length = 22.24 mm | F-number = 3.90 |
| | Total Lens Length = 41.16 mm | Field of View = 13.338 degrees |
| Telephoto End | Effective Focal Length = 36.84 mm | F-number = 4.11 |
| | Total Lens Length = 41.16 mm | Field of View = 8.104 degrees |

| Surface Number | Radius of Curvature (mm) | Thickness (mm) | Nd | Vd | Effective Focal Length (mm) | Remark |
| --- | --- | --- | --- | --- | --- | --- |
| S31 | ∞ | 3.2 | 1.52 | 64.1 | | P3 |
| S32 | ∞ | 3.2 | 1.52 | 64.1 | | |
| S33 | ∞ | 0.4 | | | | |
| S34 | 12.208 | 0.7 | 1.85 | 23.8 | −65.52 | L31 |
| S35 | 9.755 | 0.086 | | | | |
| S36 | 9.184 | 2.304 | 1.49 | 84.5 | 15.91 | L32 |
| S37 | −45.841 | 0.319 | | | | |
| S38 | ∞ | 0.211 | | | | ST31 |
| | | (Wide-angle End) | | | | |
| | | 5.001 | | | | |
| | | (Middle End) | | | | |
| | | 8.598 | | | | |
| | | (Telephoto End) | | | | |
| S39 | 68.492 | 0.6 | 1.49 | 84.5 | −10.37 | L33 |
| S310 | 4.697 | 0.937 | | | | |
| S311 | −7.999 | 0.5 | 1.74 | 49.3 | −7.27 | L34 |
| S312 | 17.258 | 0.086 | | | | |
| S313 | 8.092 | 0.769 | 1.89 | 31.2 | 10.46 | L35 |
| S314 | 55.852 | 9.042 | | | | |
| | | (Wide-angle End) | | | | |
| | | 4.252 | | | | |
| | | (Middle End) | | | | |
| | | 0.654 | | | | |
| | | (Telephoto End) | | | | |
| S315 | ∞ | −0.535 | | | | ST32 |
| S316 | 7.192 | 1.046 | 1.49 | 84.5 | 14.75 | L36 |
| S317 | ∞ | 0.427 | | | | |
| S318 | 6.922 | 2.336 | 1.49 | 84.5 | 7.77 | L37 |
| S319 | −7.452 | 0.193 | | | | |
| S320 | −7.713 | 1.106 | 1.8 | 25.5 | −99.45 | L38 |
| S321 | −9.078 | 0.396 | | | | |
| S322 | 29.061 | 0.274 | 1.85 | 40.4 | −10.42 | L39 |
| S323 | 6.807 | 4.887 | | | | |
| | | (Wide-angle End) | | | | |
| | | 6.124 | | | | |
| | | (Middle End) | | | | |
| | | 1.040 | | | | |
| | | (Telephoto End) | | | | |

TABLE 7-continued

| | | | | | | |
|---|---|---|---|---|---|---|
| S324 | 38.391 | 1 | 1.54 | 56.1 | −18.76 | L310 |
| S325 | 7.909 | 4.466 (Wide-angle End) 1.393 (Middle End) 4.936 (Telephoto End) | | | | |
| S326 | 9.760 | 1.172 | 1.62 | 25.9 | 36.18 | L311 |
| S327 | 16.499 | 0.827 (Wide-angle End) 2.663 (Middle End) 4.206 (Telephoto End) | | | | |
| S328 | ∞ | 0.21 | 1.52 | 64.2 | | OF3 |
| S329 | ∞ | 1.00 | | | | |

The definition of aspheric surface sag z of each aspheric lens in table 7 is the same as that of in Table 1, and is not described here again. In the third embodiment, the conic constant k and the aspheric coefficients A, B, C, D, E, F, G of each aspheric lens are shown in Table 8.

TABLE 8

| Surface Number | k | A E | B F | C G | D |
|---|---|---|---|---|---|
| S37 | 0 | 7.74E−05 7.12852E−11 | −1.3E−07 −1.22147E−11 | −4.65017E−08 2.70905E−13 | 3.44861E−09 |
| S39 | 0 | 0.000378 −2.47616E−07 | −3.9E−05 2.6487E−07 | 2.93851E−05 −2.57839E−08 | −5.98744E−06 |
| S313 | 0 | 1.3E−05 −3.22545E−07 | 6.74E−06 −2.94857E−09 | 3.5281E−06 4.40722E−09 | −6.44877E−07 |
| S314 | 0 | 0.000506 −4.07887E−08 | 4.21E−05 −5.63786E−08 | −4.64566E−07 6.91588E−09 | −5.50659E−07 |
| S316 | 0 | 7.15E−05 5.14282E−08 | −3E−06 −7.24504E−09 | −8.21374E−06 1.76901E−10 | 4.34831E−07 |
| S318 | 0 | −0.00077 2.48411E−09 | 1.68E−05 −3.58351E−11 | 4.9357E−06 3.63976E−10 | −2.75194E−07 |
| S319 | 0 | 0.000483 1.13955E−07 | 4.83E−06 1.09808E−08 | −9.94519E−07 −1.51774E−09 | −5.58485E−07 |
| S321 | 0 | 0.000415 0 | −2.9E−05 0 | −8.39894E−06 0 | 1.20178E−06 |
| S322 | 0 | −0.00043 3.80831E−07 | 2.29E−05 1.0539E−07 | −2.91744E−05 −1.51577E−08 | 1.97101E−07 |
| S324 | 0 | −0.00019 4.47423E−06 | −0.0001 −2.80257E−07 | 0.000120122 −9.02869E−09 | −3.48317E−05 |
| S325 | 0 | −0.00061 −2.45739E−05 | 0.000419 3.06265E−06 | −0.000226047 −1.67435E−07 | 9.8044E−05 |
| S326 | 0 | −0.00289 −5.08362E−07 | 8.09E−06 6.18004E−08 | 3.65987E−06 3.18327E−09 | −2.69255E−06 |
| S327 | 0 | −0.00322 −1.06703E−06 | 3.3E−05 6.55006E−08 | −1.7849E−05 3.77986E−09 | 3.6978E−06 |

Table 9 shows the parameters and condition values for conditions (1)-(10) in accordance with the lens assembly 3 of the third embodiment. It can be seen from Table 9 that the lens assembly 3 of the third embodiment satisfies the conditions (1)-(10). In order to achieve the preferred embodiment of the present invention, at least one of the conditions (1)-(10) is satisfied.

TABLE 9

| f1 | 21.61 mm | f2 | | −7.28 mm | f3 | 8.82 mm |
|---|---|---|---|---|---|---|
| f4 | −18.76 mm | f5 | | 36.18 mm | Dmax | 10.035 mm |
| D1r1 | 10.035 mm | | | | | |
| f1/fW | 1.746 | f2/fW | | −0.588 | f3/fW | 0.712 |
| f4/fW | −1.515 | f5/fW | | 2.922 | TTL/fW | 3.325 |
| fT/TTL | 0.895 | TTL/Dmax | | 4.102 | fT/D1r1 | 3.671 |

In addition, the lens assembly 3 of the third embodiment can meet the requirements of optical performance as seen in FIGS. 15A-15B and 16A-16B. It can be seen from FIG. 15A that the field curvature of tangential direction and sagittal direction in the lens assembly 3 of the third embodiment at the wide-angle end ranges from −0.04 mm to 0.02 mm. It can be seen from FIG. 15B that the distortion in the lens assembly 3 of the third embodiment at the wide-angle end ranges from 0% to 2%. It can be seen from FIG. 16A that the field curvature of tangential direction and sagittal direction in the lens assembly 3 of the third embodiment at the telephoto end ranges from −0.02 mm to 0.08 mm. It can be seen from FIG. 16B that the distortion in the lens assembly 3 of the third embodiment at the telephoto end ranges from 0% to 1%. In addition, the field curvature and distortion in the lens assembly 3 of the third embodiment at the middle end can also meet the requirements, and the figures are omitted here. It is obvious that the field curvature and the distortion of the lens assembly 3 of the third embodiment can be corrected effectively. Therefore, the lens assembly 3 of the third embodiment is capable of good optical performance.

Figure 17:
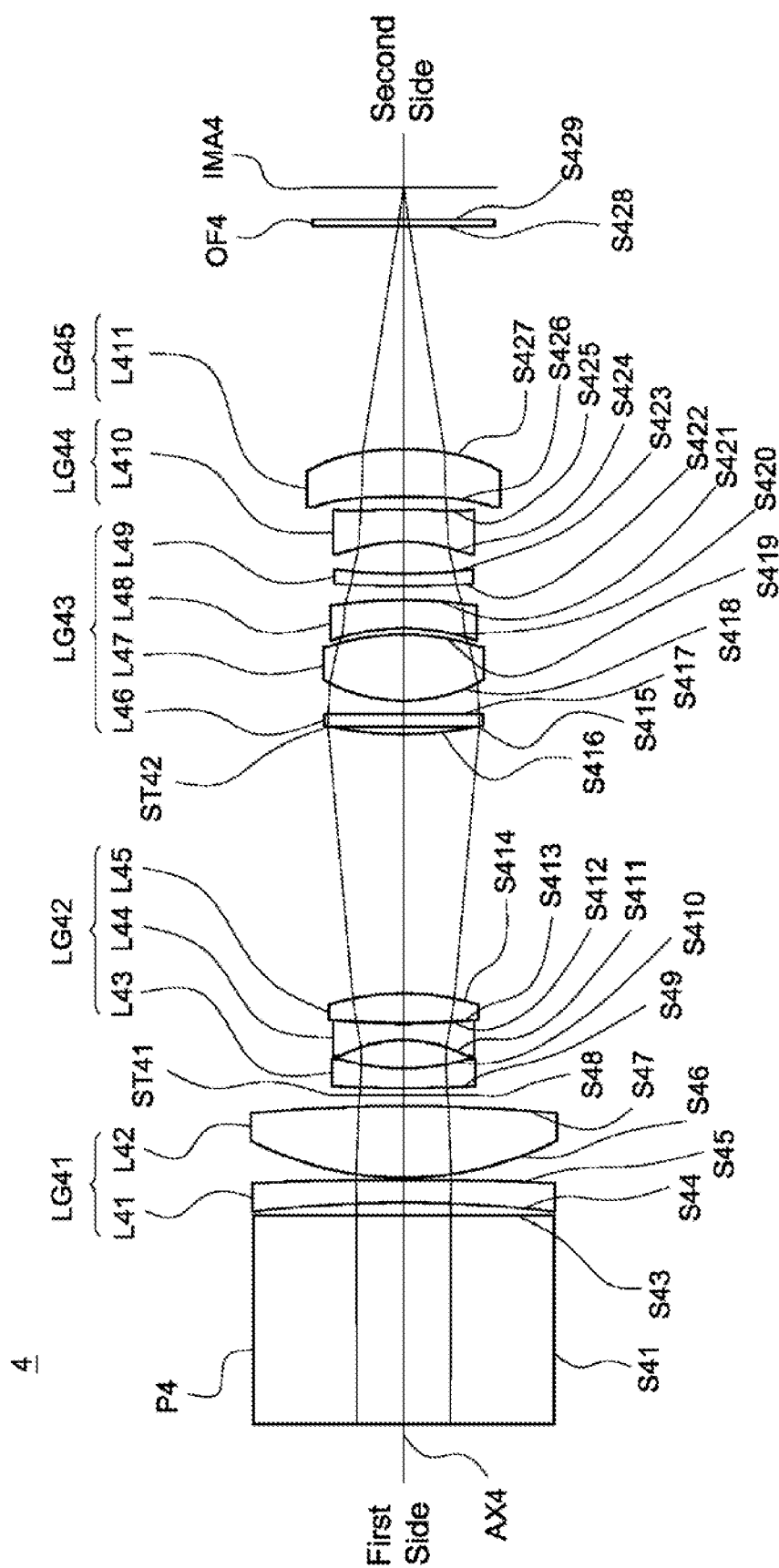
FIG. 17, FIG. 18, and FIG. 19 are lens layout diagrams of a lens assembly at the wide-angle end, the middle end, and the telephoto end in accordance with a fourth embodiment of the invention, respectively.
Figure 18:
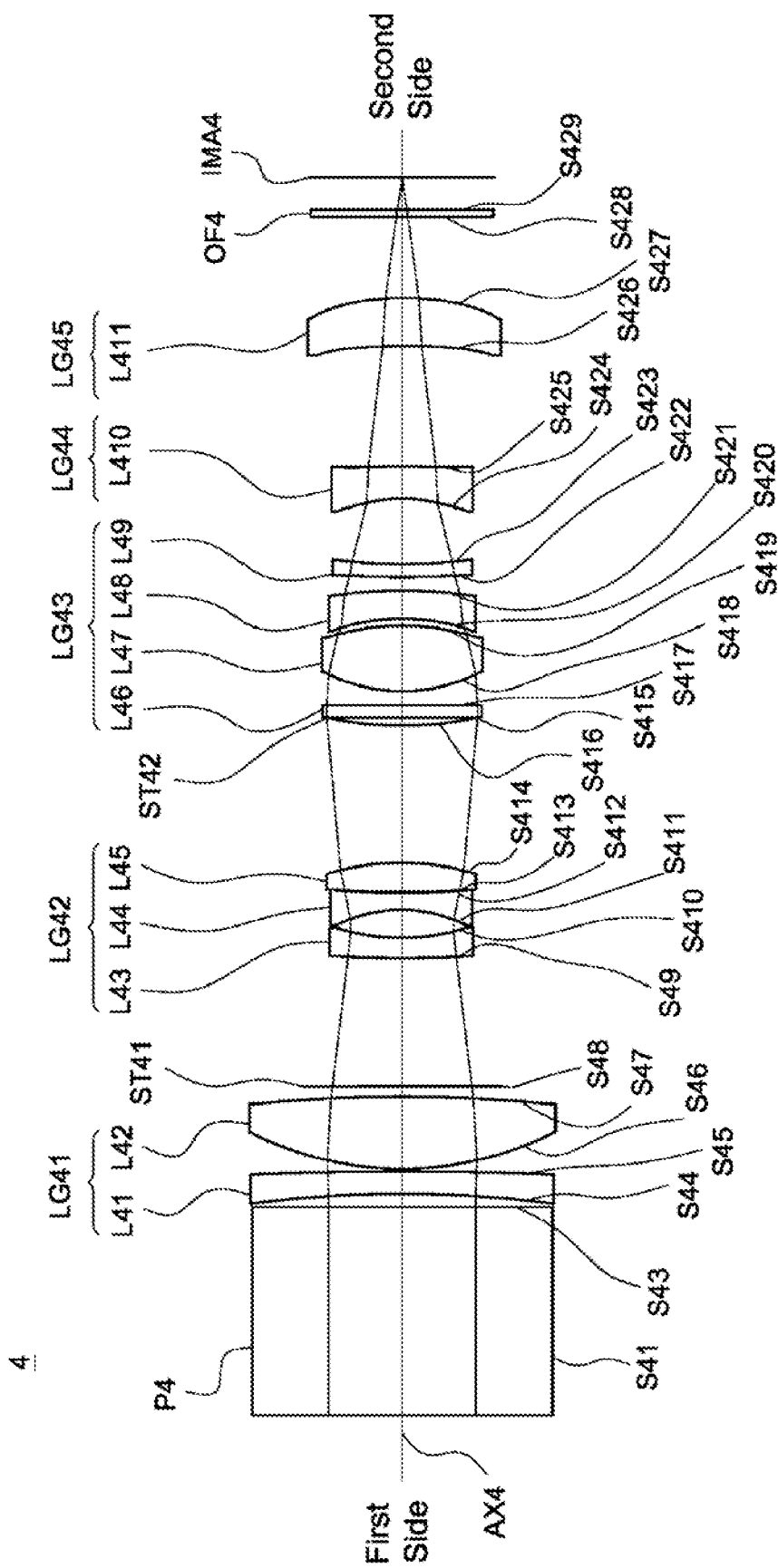
Figure 19:
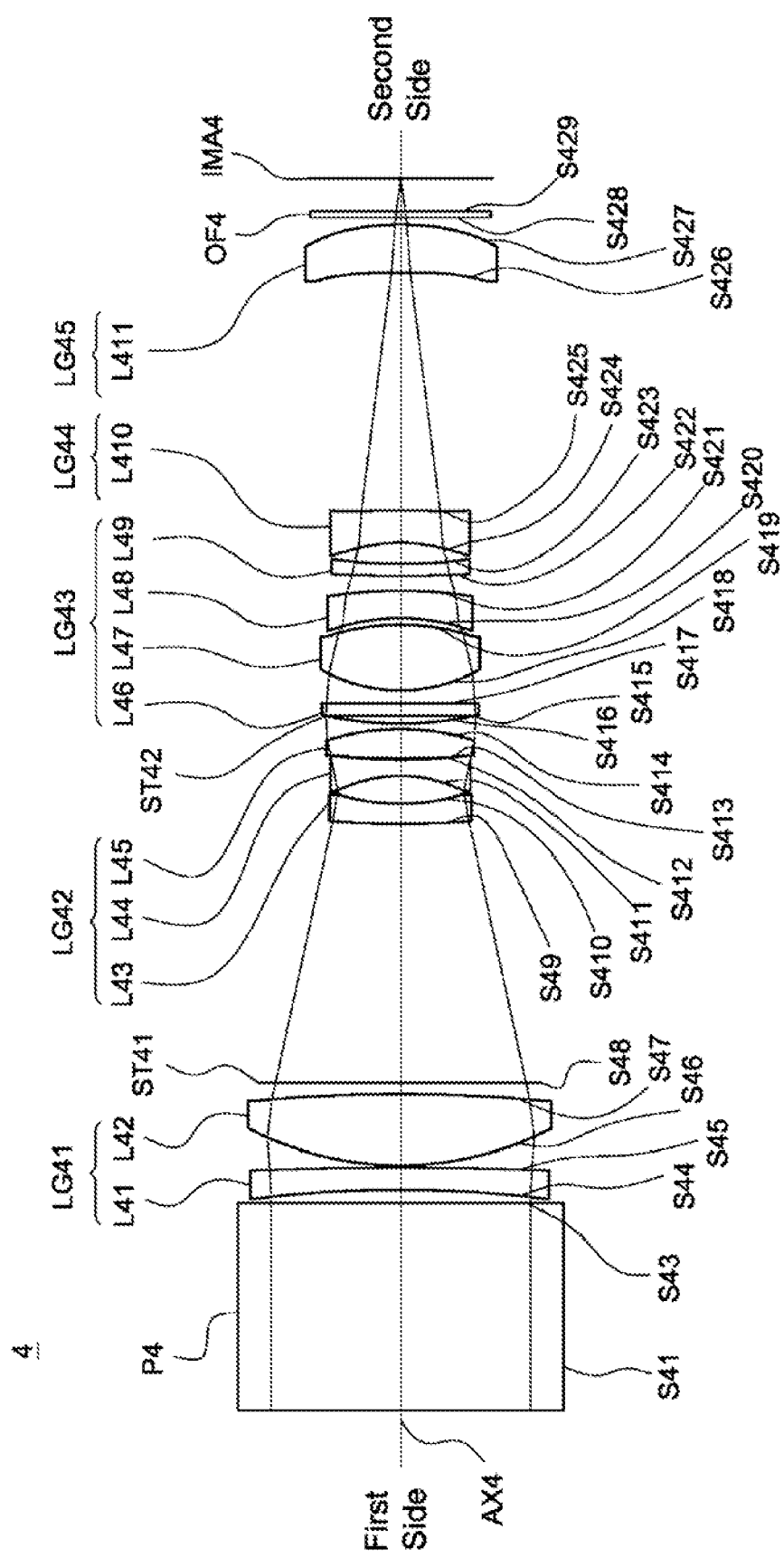
Figure 20A:
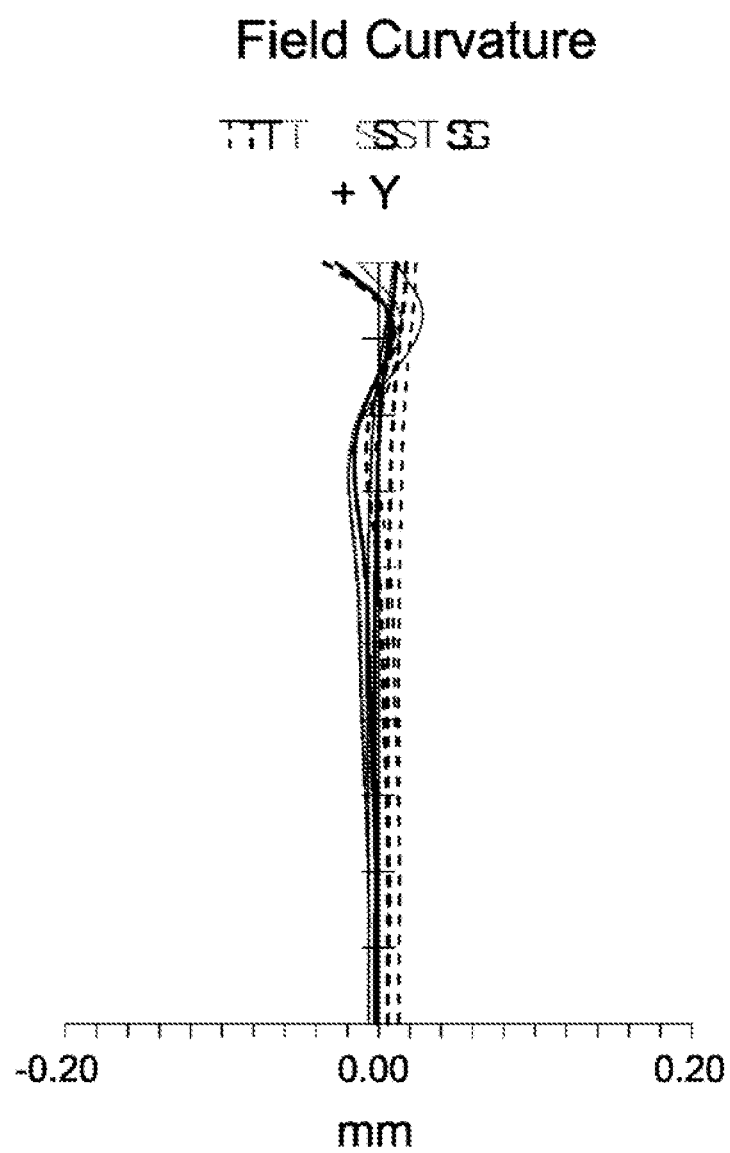
FIG. 20A and FIG. 20B depict a field curvature diagram and a distortion diagram of the lens assembly at the wide-angle end in accordance with the fourth embodiment of the invention, respectively.
Figure 20B:
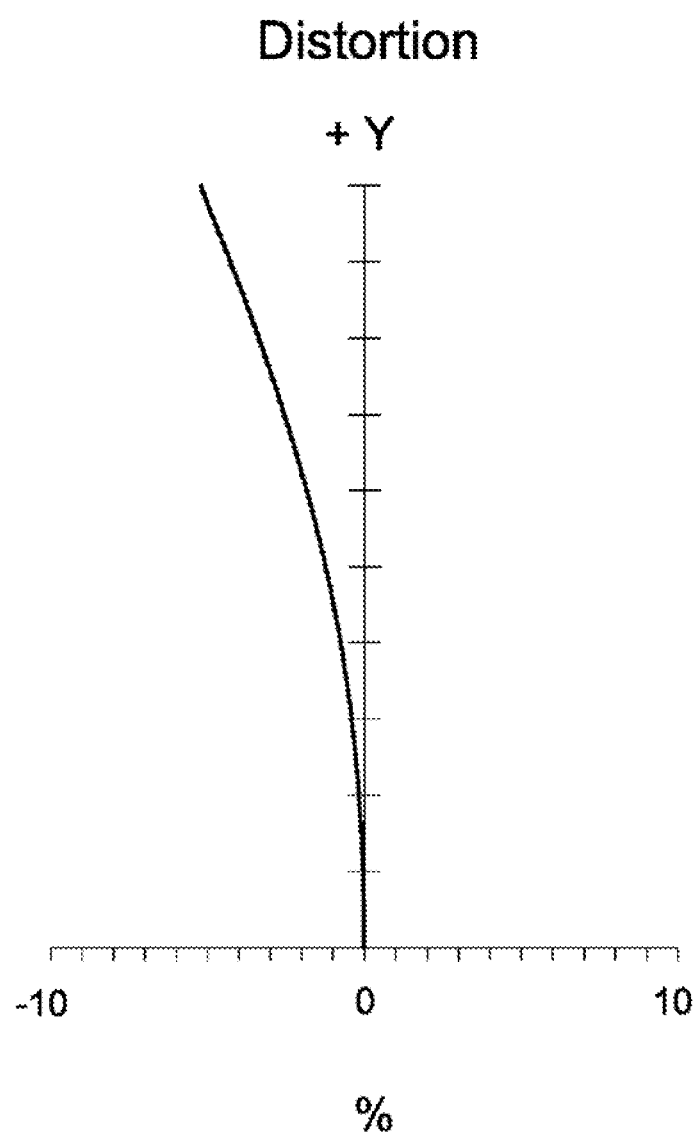
Figure 21A:
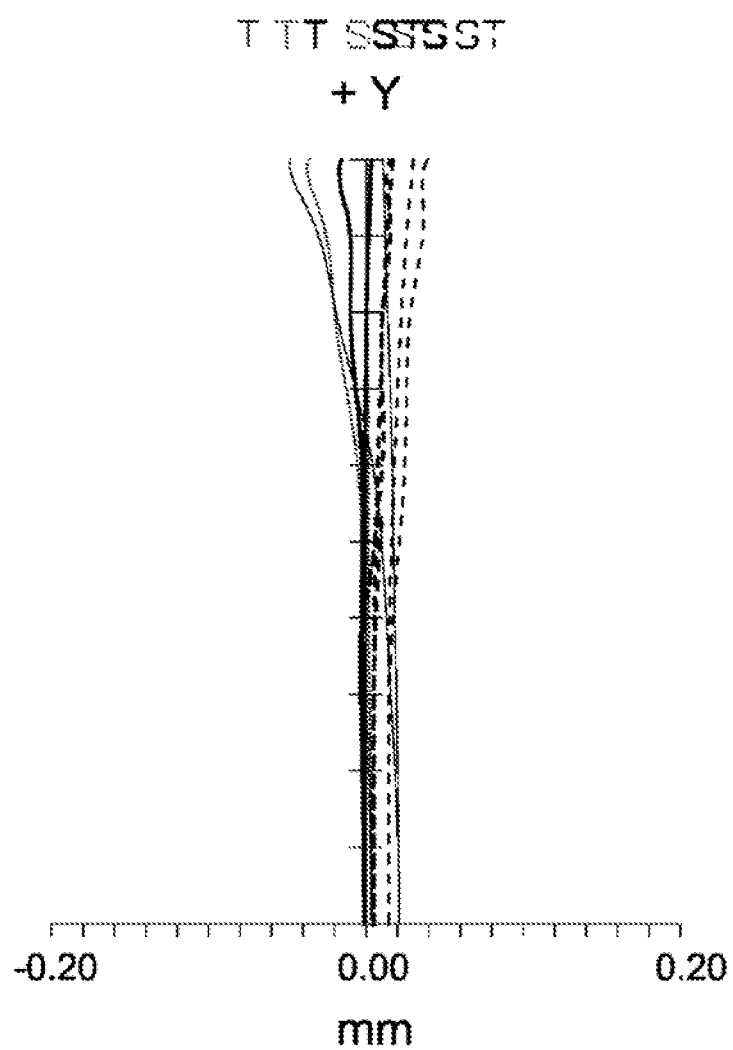
FIG. 21A and FIG. 21B depict a field curvature diagram and a distortion diagram of the lens assembly at the telephoto end in accordance with the fourth embodiment of the invention, respectively.
Figure 21B:
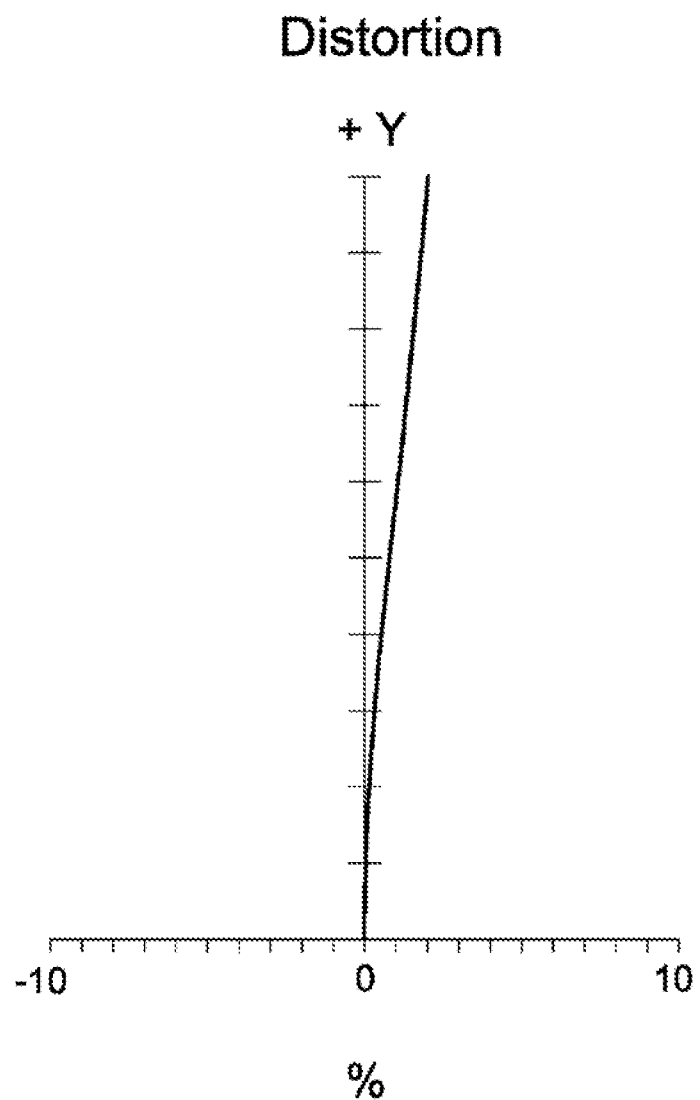

Referring to FIG. 17, FIG. 18, and FIG. 19, the lens assembly 4 includes a reflective element P4, a first lens group LG41, a shading element ST41, a second lens group LG42, a stop ST42, a third lens group LG43, a fourth lens group LG44, a fifth lens group LG45, and an optical filter OF4, all of which are arranged in order from a first side to a second side along an axis AX4. The first lens group LG41 includes a 1-1 lens L41 and a 1-2 lens L42, both of which are arranged in order from the first side to the second side along the axis AX4. The second lens group LG42 includes a 2-1 lens L43, a 2-2 lens L44, and a 2-3 lens L45, all of which are arranged in order from the first side to the second side along the axis AX4. The third lens group LG43 includes a 3-1 lens L46, a 3-2 lens L47, a 3-3 lens L48, and a 3-4 lens L49, all of which are arranged in order from the first side to the second side along the axis AX4. The fourth lens group LG44 includes a 4-1 lens L410. The fifth lens group LG45 includes a 5-1 lens L411. The incident surface S41 facing an object side (not shown) along the direction perpendicular to the axis. In operation, a light from the object side (not shown) incident on the reflective element P4 from the incident surface S41 first, then reflected by the reflective surface S42 (not shown) to change propagation direction, then sequentially passes through the exit surface S43, the first lens group LG41, the shading element ST41, the second lens group LG42, the stop ST42, the third lens group LG43, the fourth lens group LG44, the fifth lens group LG45, and the optical filter OF4, and finally imaged on an image plane IMA4. The image plane IMA4 is perpendicular to the incident surface S41 and parallel to the exit surface S43. In the fourth embodiment, the reflective element P4 is a prism and is not limited thereto. The reflective element P4 can also be a mirror and only includes a reflective surface.

When the lens assembly 4 zooms from the wide-angle end (as shown in FIG. 17) to the middle end (as shown in FIG. 18), the first lens group LG41 is fixed, the second lens group LG42 moves to the second side along the axis AX4, the third lens group LG43 is fixed, the fourth lens group LG44 moves to the second side along the axis AX4, and the fifth lens group LG45 moves to the second side along the axis AX4, so that the interval between the first lens group LG41 and the second lens group LG42 is increased, the interval between the second lens group LG42 and the third lens group LG43 is decreased, the interval between the third lens group LG43 and the fourth lens group LG44 is increased, the interval between the fourth lens group LG44 and the fifth lens group LG45 is increased, and the interval between the fifth lens group LG45 and the optical filter OF4 is decreased. When the lens assembly 4 zooms from the middle end (as shown in FIG. 18) to the telephoto end (as shown in FIG. 19), the first lens group LG41 is fixed, the second lens group LG42 moves to the second side along the axis AX4, the third lens group LG43 is fixed, the fourth lens group LG44 moves to the first side along the axis AX4, and the fifth lens group LG45 moves to the second side along the axis AX4, so that the interval between the first lens group LG41 and the second lens group LG42 is increased, the interval between the second lens group LG42 and the third lens group LG43 is decreased, the interval between the third lens group LG43 and the fourth lens group LG44 is decreased, the interval between the fourth lens group LG44 and the fifth lens group LG45 is increased, and the interval between the fifth lens group LG45 and the optical filter OF4 is decreased. The zoom magnification is approximately 3.218 times (29.93 mm/9.30 mm≈3.218) as the lens assembly 4 of the fourth embodiment zooms from the wide-angle end (as shown in FIG. 17) to the telephoto end (as shown in FIG. 19).

The shading element ST41 includes a variable hole (not shown) and the variable hole (not shown) can be changed in dimension by a driving element (not shown) driving the mechanism to achieve multi-stage changes in hole size. When the lens assembly 4 zooms from the wide-angle end (as shown in FIG. 17) to the middle end (as shown in FIG. 18) and from the middle end (as shown in FIG. 18) to the telephoto end (as shown in FIG. 19), the variable hole (not shown) of the shading element ST41 will change according to the effective focal length of the lens assembly 4. The correspondingly change in the size of the variable hole leads to change f-Number.

Among the first lens group LG41, the second lens group LG42, the third lens group LG43, the fourth lens group LG44, and the fifth lens group LG45, the effective optical range is non-circular symmetry for at least one lens, so that the effective optical diameter of the short side direction is different from the effective optical diameter of the long side direction. When the lens assembly 4 is at the telephoto end, the schematic diagram of the effective optical diameter in the short side direction and long side direction is similar to FIG. 6.

The 3-2 lens L47 and the 3-3 lens L48 of the third lens group LG43 can move perpendicular to the axis AX4 to achieve optical image stabilization. The fourth lens group LG44 can move along the axis AX4 to achieve auto focus.

According to the foregoing, wherein: the first side surface S44 of the 1-1 lens L41 is a concave surface and the second side surface S45 of the 1-1 lens L41 is a convex surface; the 2-3 lens L45 is a biconvex lens, wherein the second side surface S414 is a convex surface; the first side surface S424 of the 4-1 lens L410 is a concave surface and the second side surface S425 of the 4-1 lens L410 is a convex surface; the first side surface S426 of the 5-1 lens L411 is a concave surface and the second side surface S427 of the 5-1 lens L411 is a convex surface; and both of the first side surface S428 and second side surface S429 of the optical filter OF4 are plane surfaces.

With the above design of the lenses, reflective element P4, shading element ST41, stop ST42, and at least one of the conditions (1)-(16) satisfied, the lens assembly 4 can have an effective shortened total lens length, an effective decreased thickness, an effective increased resolution, an effective increased brightness uniformity, an effective corrected aberration, an effective corrected chromatic aberration, and a realized optical zoom function. The preferred embodiment of the present invention can be achieved when the lens assembly satisfies conditions (1)-(16), refractive power distribution, and surface shape.

Table 10 shows the optical specification of the lens assembly 4 in FIG. 17, FIG. 18, and FIG. 19 when the lens assembly 4 is at the wide-angle end, middle end, and telephoto end, respectively.

TABLE 10

| | | |
|---|---|---|
| Wide-angle End | Effective Focal Length = 9.30 mm | F-number = 3.51 |
| | Total Lens Length = 38.04 mm | Field of View = 33.234 degrees |
| Middle End | Effective Focal Length = 16.03 mm | F-number = 3.81 |
| | Total Lens Length = 38.04 mm | Field of View = 18.666 degrees |
| Telephoto End | Effective Focal Length = 29.93 mm | F-number = 4.05 |

TABLE 10-continued

| | Total Lens Length = 38.04 mm | | | Field of View = 9.850 degrees | | |
|---|---|---|---|---|---|---|
| Surface Number | Radius of Curvature (mm) | Thickness (mm) | Nd | Vd | Effective Focal Length (mm) | Remark |
| S41 | ∞ | 3.2 | 1.52 | 64.1 | | P4 |
| S42 | ∞ | 3.2 | 1.52 | 64.1 | | |
| S43 | ∞ | 0.4 | | | | |
| S44 | −32.523 | 0.7 | 1.85 | 23.8 | −57.37 | L41 |
| S45 | −100.296 | 0.091 | | | | |
| S46 | 8.975 | 2.199 | 1.49 | 84.5 | 14.69 | L42 |
| S47 | −32.092 | 0.324 | | | | |
| S48 | ∞ | 0.223 | | | | ST41 |
| | | (Wide-angle End) 3.990 | | | | |
| | | (Middle End) 8.027 | | | | |
| | | (Telephoto End) | | | | |
| S49 | 306.039 | 0.6 | 1.49 | 84.5 | −12.23 | L43 |
| S410 | 5.827 | 0.864 | | | | |
| S411 | −3.664 | 0.5 | 1.74 | 49.3 | −4.01 | L44 |
| S412 | 16.748 | 0.030 | | | | |
| S413 | 24.535 | 0.925 | 1.9 | 31.2 | 5.69 | L45 |
| S414 | −6.301 | 8.186 | | | | |
| | | (Wide-angle End) 4.419 | | | | |
| | | (Middle End) 0.382 | | | | |
| | | (Telephoto End) | | | | |
| S415 | ∞ | −0.237 | | | | ST42 |
| S416 | 10.578 | 0.631 | 1.49 | 84.5 | 21.77 | L46 |
| S417 | ∞ | 0.420 | | | | |
| S418 | 4.733 | 2.028 | 1.49 | 84.5 | 5.32 | L47 |
| S419 | −4.903 | 0.197 | | | | |
| S420 | −5.675 | 0.845 | 1.8 | 25.5 | −10.90 | L48 |
| S421 | −17.333 | 0.440 | | | | |
| S422 | 20.175 | 0.394 | 1.85 | 40.4 | −61.25 | L49 |
| S423 | 14.418 | 0.976 | | | | |
| | | (Wide-angle End) 2.023 | | | | |
| | | (Middle End) 0.658 | | | | |
| | | (Telephoto End) | | | | |
| S424 | −3.498 | 1 | 1.54 | 56.1 | −8.88 | L410 |
| S425 | −14.654 | 0.369 | | | | |
| | | (Wide-angle End) 3.663 | | | | |
| | | (Middle End) 7.327 | | | | |
| | | (Telephoto End) | | | | |
| S426 | −26.284 | 1.482 | 1.62 | 25.9 | 16.36 | L411 |
| S427 | −7.411 | 6.845 | | | | |
| | | (Wide-angle End) 2.504 | | | | |
| | | (Middle End) 0.206 | | | | |
| | | (Telephoto End) | | | | |
| S428 | ∞ | 0.21 | 1.52 | 64.2 | | OF4 |
| S429 | ∞ | 1.00 | | | | |

The definition of aspheric surface sag z of each aspheric lens in table 10 is the same as that of in Table 1, and is not described here again. In the fourth embodiment, the conic constant k and the aspheric coefficients A, B, C, D, E, F, G of each aspheric lens are shown in Table 11.

TABLE 11

| Surface Number | k | A<br>E | B<br>F | C<br>G | D |
|---|---|---|---|---|---|
| S47 | 0 | 0.000221<br>−9.48901E−10 | −8.8E−07<br>3.24631E−11 | −9.59117E−08<br>−4.48752E−13 | 1.40526E−08 |
| S49 | 0 | 0.001565<br>−7.98225E−06 | 0.00013<br>1.27435E−06 | 2.36937E−06<br>−6.38264E−08 | 2.3947E−05 |
| S413 | 0 | 0.001645<br>−1.78236E−05 | 7.48E−05<br>3.05843E−06 | −0.000161598<br>−2.65627E−07 | 5.56795E−05 |
| S414 | 0 | 0.001291<br>−6.87663E−06 | 0.000209<br>8.87147E−07 | −9.95551E−05<br>−7.80131E−08 | 2.67469E−05 |
| S416 | 0 | 0.000926<br>−2.62665E−07 | 4.62E−05<br>−1.13319E−07 | −3.37781E−05<br>1.20703E−08 | 7.13428E−06 |
| S418 | 0 | 0.000325<br>1.37508E−07 | 0.000203<br>−9.18866E−08 | −1.3899E−05<br>9.8263E−09 | 4.20805E−06 |
| S419 | 0 | 0.005555<br>−6.04989E−06 | 0.000249<br>4.50243E−07 | −0.000161301<br>−1.12331E−08 | 4.13454E−05 |
| S421 | 0 | −0.00272<br>0 | 8.07E−05<br>0 | 3.88595E−05<br>0 | −1.32997E−06 |
| S422 | 0 | −0.00206<br>2.28515E−07 | 0.0002<br>−2.79752E−07 | −7.22426E−05<br>1.45336E−08 | 1.24811E−05 |
| S424 | 0 | 0.016362<br>3.73449E−05 | −0.00113<br>−1.52499E−05 | −6.64839E−05<br>1.67946E−06 | 1.71498E−05 |
| S425 | 0 | 0.009575<br>7.15415E−05 | −0.00059<br>−1.66526E−05 | 7.98215E−05<br>1.36619E−06 | −0.000124501 |
| S426 | 0 | −0.00341<br>1.79238E−05 | −0.00051<br>−2.03211E−06 | 0.000236837<br>9.43004E−08 | −8.43327E−05 |
| S427 | 0 | −0.00128<br>2.35598E−05 | −0.00088<br>−2.17894E−06 | 0.000416928<br>8.10885E−08 | −0.000131706 |

Table 12 shows the parameters and condition values for conditions (1)-(10) in accordance with the lens assembly 4 of the fourth embodiment. Table 13 shows the parameters and condition values for conditions (11)-(16) in accordance with the lens assembly 4 of the fourth embodiment at the wide-angle end. Table 14 shows the parameters and condition values for conditions (11)-(16) in accordance with the lens assembly 4 of the fourth embodiment at the middle end. Table 15 shows the parameters and condition values for conditions (11)-(16) in accordance with the lens assembly 4 of the fourth embodiment at the telephoto end. It can be seen from Table 12, Table 13, Table 14, and Table 15 that the lens assembly 4 of the fourth embodiment satisfies the conditions (1)-(16). In order to achieve the preferred embodiment of the present invention, at least one of the conditions (1)-(16) is satisfied.

TABLE 12

| f1 | 19.30 mm | f2 | −8.31 mm | f3 | 7.07 mm |
|---|---|---|---|---|---|
| f4 | −8.88 mm | f5 | 16.36 mm | Dmax | 8.687 mm |
| D1r1 | 8.532 mm | | | | |
| f1/fW | 2.075 | f2/fW | −0.894 | f3/fW | 0.760 |
| f4/fW | −0.955 | f5/fW | 1.759 | TTL/fW | 4.090 |
| fT/TTL | 0.787 | TTL/Dmax | 4.379 | fT/D1r1 | 3.508 |

TABLE 13

| EPA | 8.835 mm² | STD | 5.52 mm | EPDX | 3.43 mm |
|---|---|---|---|---|---|
| EPDY | 3.048 mm | PL | 10.8 mm | PH | 6.4 mm |
| EPA/STD | 1.60 mm | EPDX/STD | 0.62 | EPDY/STD | 0.55 |
| PL/EPDX | 3.15 | PH/EPDY | 2.10 | EPA/PL | 0.82 mm |

TABLE 14

| EPA | 25.573 mm² | STD | 5.52 mm | EPDX | 5.724 mm |
|---|---|---|---|---|---|
| EPDY | 5.552 mm | PL | 10.8 mm | PH | 6.4 mm |
| EPA/STD | 4.63 mm | EPDX/STD | 1.04 | EPDY/STD | 1.01 |
| PL/EPDX | 1.89 | PH/EPDY | 1.15 | EPA/PL | 2.37 mm |

TABLE 15

| EPA | 47.530 mm² | STD | 5.52 mm | EPDX | 9.1 mm |
|---|---|---|---|---|---|
| EPDY | 5.6 mm | PL | 10.8 mm | PH | 6.4 mm |
| EPA/STD | 8.61 mm | EPDX/STD | 1.65 | EPDY/STD | 1.01 |
| PL/EPDX | 1.19 | PH/EPDY | 1.14 | EPA/PL | 4.40 mm |

In addition, the lens assembly 4 of the fourth embodiment can meet the requirements of optical performance as seen in FIGS. 20A-20B and 21A-21B. It can be seen from FIG. 20A that the field curvature of tangential direction and sagittal direction in the lens assembly 4 of the fourth embodiment at the wide-angle end ranges from −0.04 mm to 0.03 mm. It can be seen from FIG. 20B that the distortion in the lens assembly 4 of the fourth embodiment at the wide-angle end ranges from −6% to 0%. It can be seen from FIG. 21A that the field curvature of tangential direction and sagittal direction in the lens assembly 4 of the fourth embodiment at the telephoto end ranges from −0.06 mm to 0.04 mm. It can be seen from FIG. 21B that the distortion in the lens assembly 4 of the fourth embodiment at the telephoto end ranges from 0% to 2%. In addition, the field curvature and distortion in the lens assembly 4 of the fourth embodiment at the middle end can also meet the requirements, and the figures are omitted here. It is obvious that the field curvature and the distortion of the lens assembly 4 of the fourth embodiment can be corrected effectively. Therefore, the lens assembly 4 of the fourth embodiment is capable of good optical performance.

In the above embodiment, only one reflective element is disposed between the first side and the first lens group. However, it can be understood that another reflective element can also be added between the first lens group and the fifth lens group, or between the fifth lens group and the second side, that is, one reflective element is disposed between the first side and the first lens group, another reflective element is disposed between the first lens group and the fifth lens group, or between the fifth lens group and the second side. In other words, the reflective element can be disposed between the first side and the second side, and falls into the scope of the invention.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
a first lens group which is with positive refractive power;
a shading element;
a second lens group which is with negative refractive power;
a third lens group which is with positive refractive power;
a fourth lens group which is with negative refractive power;
a fifth lens group which is with positive refractive power; and
a reflective element which comprises a reflective surface;
wherein the first lens group, the second lens group, the third lens group, the fourth lens group, and the fifth lens group are arranged in order from a first side to a second side along an axis;
wherein a light from an object side sequentially passes through the first lens group, the second lens group, the third lens group, the fourth lens group, and the fifth lens group to the second side;
wherein the shading element comprises a variable hole and the variable hole is a non-circular hole;
wherein the reflective element is disposed between the first side and the second side;
wherein intervals of the lens groups are changeable, so that the lens assembly can change the effective focal length.

2. The lens assembly as claimed in claim 1, wherein the shading element disposed between the first lens group and the second lens group.

3. The lens assembly as claimed in claim 2, wherein the variable hole can change dimension according to the effective focal length of the lens assembly.

4. The lens assembly as claimed in claim 1, wherein at least one lens of the lens groups has different effective optical diameters in the short side direction and in the long side direction.

5. The lens assembly as claimed in claim 4, wherein the third lens group comprises a plurality of lenses and some of the lenses can be moved perpendicular to the direction perpendicular to the axis to achieve optical image stabilization.

6. The lens assembly as claimed in claim 4, wherein the reflective element is disposed between the first side and the first lens group and the fourth lens group can move along the axis to perform focusing.

7. The lens assembly as claimed in claim 1, wherein the second lens group, the fourth lens group, and the fifth lens group can move along the axis and the first lens group and the third lens group are fixed to change intervals of the lens groups, so that the lens assembly can change the effective focal length.

8. A lens assembly comprising:
a first lens group which is with positive refractive power;
a second lens group which is with negative refractive power;
a stop;
a third lens group which is with positive refractive power;
a fourth lens group which is with negative refractive power;
a fifth lens group which is with positive refractive power; and
a reflective element which comprises a reflective surface;
wherein the first lens group, the second lens group, the stop, the third lens group, the fourth lens group, and the fifth lens group are arranged in order from a first side to a second side along an axis;
wherein a light from an object side sequentially passes through the first lens group, the second lens group, the stop, the third lens group, the fourth lens group, and the fifth lens group to the second side;
wherein the reflective element is disposed between the first side and the second side;
wherein intervals of the lens groups are changeable, so that the lens assembly can change the effective focal length;
wherein the reflective element further comprises an incident surface and an exit surface and both of which are connected to the reflective surface;
wherein the incident surface faces the object side along the direction perpendicular to the axis;
wherein the exit surface faces the second side along the axis; and
the lens assembly satisfies at least one of following conditions:

$0.5 \text{ mm} < EPA/PL < 5.5 \text{ mm}$;

$0.7 \text{ mm} < EPA/STD < 10 \text{ mm}$;

$0.2 < EPDX/STD < 2.1$;

$0 < EPDY/STD < 1.5$;

$0.8 < PL/EPDX < 4$;

$0.7 < PH/EPDY < 3$;

$-1.1 < f2/fW < -0.3$;

$0.6 < f3/fW < 0.8$;

$2 < TTL/fW < 4.5$;

$3.8 < TTL/D \text{ max} < 5.2$;

$7 \text{ mm} < D \text{ max} < 12 \text{ mm}$;

$2.9 < fT/D1r1 < 4.2$;

wherein EPA is an area of an entrance pupil of the lens assembly, PL is a length of the reflective element, the length is equal to a length of a side of the reflective surface and the side is perpendicular to the axis, STD is a diameter of the stop, EPDX is a maximum entrance pupil interval when the entrance pupil passes through the axis, EPDY is a minimum entrance pupil interval when the entrance pupil passes through the axis, PH is a height of the reflective element, the height is equal to a length of a side of the exit surface, and the direction of the side is perpendicular to the incident surface, f2 is an effective focal length of the second lens group, f3 is an effective focal length of the third lens group, fW is an effective focal length of the lens assembly as the lens assembly is at the wide-angle end, fT is an effective focal length of the lens assembly as the lens assembly is at the telephoto end, TTL is an interval from the incident surface of the reflective element to an image plane along the direction perpendicular to the axis and the axis, Dmax is a maximum effective optical diameter among all lenses, and D1r1 is an effective optical diameter of a first side surface of a lens closest to the first side.

9. The lens assembly as claimed in claim 1, wherein:
the first lens group comprises a 1-1 lens and a 1-2 lens, both of which are arranged in order from the first side to the second side along the axis;

the second lens group comprises a 2-1 lens, a 2-2 lens, and a 2-3 lens, all of which are arranged in order from the first side to the second side along the axis;
the third lens group comprises a 3-1 lens, a 3-2 lens, a 3-3 lens, and a 3-4 lens, all of which are arranged in order from the first side to the second side along the axis;
the fourth lens group comprises a 4-1 lens; and
the fifth lens group comprises a 5-1 lens.

10. The lens assembly as claimed in claim 9, wherein:
the 1-1 lens is a meniscus lens with negative refractive power and the 1-2 lens is a biconvex lens with positive refractive power and comprises a convex surface facing the first side along the axis and another convex surface facing the second side along the axis; and
the 2-1 lens is a meniscus lens with negative refractive power and comprises a convex surface facing the first side along the axis and a concave surface facing the second side along the axis, the 2-2 lens is a biconcave lens with negative refractive power and comprises a concave surface facing the first side along the axis and another concave surface facing the second side along the axis, and the 2-3 lens is with positive refractive power and comprises a convex surface facing the first side along the axis.

11. A lens assembly comprising:
a first lens group which is with positive refractive power;
a second lens group which is with negative refractive power;
a third lens group which is with positive refractive power;
a fourth lens group which is with negative refractive power;
a fifth lens group which is with positive refractive power; and
a reflective element which comprises a reflective surface;
wherein the first lens group, the second lens group, the third lens group, the fourth lens group, and the fifth lens group are arranged in order from a first side to a second side along an axis;
wherein a light from an object side sequentially passes through the first lens group, the second lens group, the third lens group, the fourth lens group, and the fifth lens group to the second side;
wherein the reflective element is disposed between the first side and the second side;
wherein intervals of the lens groups are changeable, so that the lens assembly can change the effective focal length;
wherein the third lens group comprises a 3-1 lens, a 3-2 lens, a 3-3 lens, and a 3-4 lens, all of which are arranged in order from the first side to the second side along the axis;
wherein the 3-1 lens is a plano-convex lens with positive refractive power and comprises a convex surface facing the first side along the axis and a plane surface facing the second side along the axis, the 3-2 lens is a biconvex lens with positive refractive power and comprises a convex surface facing the first side along the axis and another convex surface facing the second side along the axis, the 3-3 lens is a meniscus lens with negative refractive power and comprises a concave surface facing the first side along the axis and a convex surface facing the second side along the axis, and the 3-4 lens is a meniscus lens with negative refractive power and comprises a convex surface facing the first side along the axis and a concave surface facing the second side along the axis;
wherein the fourth lens group comprises a 4-1 lens and the fifth lens group comprises a 5-1 lens;
wherein the 4-1 lens is a meniscus lens with negative refractive power and the 5-1 lens is a meniscus lens with positive refractive power.

12. The lens assembly as claimed in claim 10, wherein:
the 1-1 lens comprises a convex surface facing the first side along the axis and a concave surface facing the second side along the axis; and
the 2-3 lens further comprises a concave surface facing the second side along the axis.

13. The lens assembly as claimed in claim 11, wherein:
the 4-1 lens comprises a convex surface facing the first side along the axis and a concave surface facing the second side along the axis; and
the 5-1 lens comprises a convex surface facing the first side along the axis and a concave surface facing the second side along the axis.

14. The lens assembly as claimed in claim 10, wherein:
the 1-1 lens comprises a concave surface facing the first side along the axis and a convex surface facing the second side along the axis; and
the 2-3 lens further comprises another convex surface facing the second side along the axis.

15. The lens assembly as claimed in claim 11, wherein:
the 4-1 lens comprises a concave surface facing the first side along the axis and a convex surface facing the second side along the axis; and
the 5-1 lens comprises a concave surface facing the first side along the axis and a convex surface facing the second side along the axis.

16. The lens assembly as claimed in claim 1, wherein the lens assembly satisfies at least one of following conditions:

$$1.5 < f1/fW < 2.5;$$

$$-1.1 < f2/fW < -0.3;$$

$$0.6 < f3/fW < 0.8;$$

$$-2 < f4/fW < -0.5;$$

$$1 < f5/fW < 3.5;$$

wherein f1 is an effective focal length of the first lens group, f2 is an effective focal length of the second lens group, f3 is an effective focal length of the third lens group, f4 is an effective focal length of the fourth lens group, f5 is an effective focal length of the fifth lens group, and fW is an effective focal length of the lens assembly as the lens assembly is at the wide-angle end.

17. The lens assembly as claimed in claim 1, wherein:
the reflective element further comprises an incident surface connecting the reflective surface;
the incident surface faces the object side along the direction perpendicular to the axis; and
the lens assembly satisfies at least one of following conditions:

$$2 < TTL/fW < 4.5;$$

$$0.5 < fT/TTL < 1;$$

$$3.8 < TTL/D\,max < 5.2;$$

$$7\ mm < D\,max < 12\ mm;$$

$$2.9 < fT/D1r1 < 4.2;$$

wherein fW is an effective focal length of the lens assembly as the lens assembly is at the wide-angle end, fT is an effective focal length of the lens assembly as the lens assembly is at the telephoto end, TTL is an interval from the incident surface of the reflective element to an image plane along the direction perpendicular to the axis and the axis, Dmax is a maximum effective optical diameter among all lenses, and D1r1 is an effective optical diameter of a first side surface of a lens closest to the first side.

18. The lens assembly as claimed in claim 12, further comprising a stop and a shading element, wherein the stop disposed between the second lens group and the third lens group, the shading element disposed between the first lens group and the second lens group, and the shading element comprises a variable hole; wherein:
- at least one lens of the lens groups has different effective optical diameters in the short side direction and in the long side direction;
- the second lens group, the fourth lens group, and the fifth lens group can move along the axis, and the first lens group and the third lens group are fixed to change intervals of the lens groups, so that the lens assembly can change the effective focal length;
- the reflective element further comprises an incident surface and an exit surface and both of which are connected to the reflective surface;
- the incident surface faces the object side along the direction perpendicular to the axis;
- the exit surface faces the second side along the axis; and
- the lens assembly satisfies at least one of following conditions:

$1.5 < f1/fW < 2.5;$ $-1.1 < f2/fW < -0.3;$ $0.6 < f3/fW < 0.8;$ $-2 < f4/fW < -0.5;$ $1 < f5/fW < 3.5;$ $2 < TTL/fW < 4.5;$ $0.5 < fT/TTL < 1;$ $3.8 < TTL/D\max < 5.2;$ $7 \text{ mm} < D\max < 12 \text{ mm};$ $2.9 < fT/D1r1 < 4.2;$ $0.5 \text{ mm} < EPA/PL < 5.5 \text{ mm};$ $0.7 \text{ mm} < EPA/STD < 10 \text{ mm};$ $0.2 < EPDX/STD < 2.1;$ $0 < EPDY/STD < 1.5;$ $0.8 < PL/EPDX < 4;$ $0.7 < PH/EPDY < 3;$ wherein f1 is an effective focal length of the first lens group, f2 is an effective focal length of the second lens group, f3 is an effective focal length of the third lens group, f4 is an effective focal length of the fourth lens group, f5 is an effective focal length of the fifth lens group, fW is an effective focal length of the lens assembly as the lens assembly is at the wide-angle end, fT is an effective focal length of the lens assembly as the lens assembly is at the telephoto end, TTL is an interval from the incident surface of the reflective element to an image plane along the direction perpendicular to the axis and the axis, Dmax is a maximum effective optical diameter among all lenses, D1r1 is an effective optical diameter of a first side surface of a lens closest to the first side, EPA is an area of an entrance pupil of the lens assembly, PL is a length of the reflective element, the length is equal to a length of a side of the reflective surface and the side is perpendicular to the axis, STD is a diameter of the stop, EPDX is a maximum entrance pupil interval when the entrance pupil passes through the axis, EPDY is a minimum entrance pupil interval when the entrance pupil passes through the axis, and PH is a height of the reflective element, the height is equal to a length of a side of the exit surface, and the direction of the side is perpendicular to the incident surface.

19. The lens assembly as claimed in claim 3, wherein at least one lens of the lens groups has different effective optical diameters in the short side direction and in the long side direction, wherein:
- the third lens group comprises a plurality of lenses and some of the lenses can be moved perpendicular to the direction perpendicular to the axis to achieve optical image stabilization;
- the reflective element is disposed between the first side and the first lens group, and the fourth lens group can move along the axis to perform focusing;
- the second lens group, the fourth lens group, and the fifth lens group can move along the axis, and the first lens group and the third lens group are fixed to change intervals of the lens groups, so that the lens assembly can change the effective focal length;
- the reflective element further comprises an incident surface and an exit surface and both of which are connected to the reflective surface;
- the incident surface faces the object side along the direction perpendicular to the axis;
- the exit surface faces the second side along the axis; and
- the lens assembly satisfies at least one of following conditions:

$1.5 < f1/fW < 2.5;$ $-1.1 < f2/fW < -0.3;$ $0.6 < f3/fW < 0.8;$ $-2 < f4/fW < -0.5;$ $1 < f5/fW < 3.5;$ $2 < TTL/fW < 4.5;$ $0.5 < fT/TTL < 1;$ $3.8 < TTL/D\max < 5.2;$ $7 \text{ mm} < D\max < 12 \text{ mm};$ $2.9 < fT/D1r1 < 4.2;$ $0.5 \text{ mm} < EPA/PL < 5.5 \text{ mm};$ $0.7 \text{ mm} < EPA/STD < 10 \text{ mm};$ $0.2 < EPDX/STD < 2.1;$ $0 < EPDY/STD < 1.5;$ $0.8<PL/EPDX<4;$ $0.7<PH/EPDY<3;$ wherein f1 is an effective focal length of the first lens group, f2 is an effective focal length of the second lens group, f3 is an effective focal length of the third lens group, f4 is an effective focal length of the fourth lens group, f5 is an effective focal length of the fifth lens group, fW is an effective focal length of the lens assembly as the lens assembly is at the wide-angle end, fT is an effective focal length of the lens assembly as the lens assembly is at the telephoto end, TTL is an interval from the incident surface of the reflective element to an image plane along the direction perpendicular to the axis and the axis, Dmax is a maximum effective optical diameter among all lenses, D1r1 is an effective optical diameter of a first side surface of a lens closest to the first side, EPA is an area of an entrance pupil of the lens assembly, PL is a length of the reflective element, the length is equal to a length of a side of the reflective surface and the side is perpendicular to the axis, STD is a diameter of the stop, EPDX is a maximum entrance pupil interval when the entrance pupil passes through the axis, EPDY is a minimum entrance pupil interval when the entrance pupil passes through the axis, and PH is a height of the reflective element, the height is equal to a length of a side of the exit surface, and the direction of the side is perpendicular to the incident surface.

20. The lens assembly as claimed in claim 7, wherein:
the first lens group comprises a 1-1 lens and a 1-2 lens, both of which are arranged in order from the first side to the second side along the axis, wherein the 1-1 lens is a meniscus lens with negative refractive power and the 1-2 lens is a biconvex lens with positive refractive power and comprises a convex surface facing the first side along the axis and another convex surface facing the second side along the axis;
the second lens group comprises a 2-1 lens, a 2-2 lens, and a 2-3 lens, all of which are arranged in order from the first side to the second side along the axis, wherein the 2-1 lens is a meniscus lens with negative refractive power and comprises a convex surface facing the first side along the axis and a concave surface facing the second side along the axis, the 2-2 lens is a biconcave lens with negative refractive power and comprises a concave surface facing the first side along the axis and another concave surface facing the second side along the axis, and the 2-3 lens is with positive refractive power and comprises a convex surface facing the first side along the axis;
the third lens group comprises a 3-1 lens, a 3-2 lens, a 3-3 lens, and a 3-4 lens, all of which are arranged in order from the first side to the second side along the axis, wherein the 3-1 lens is a plano-convex lens with positive refractive power and comprises a convex surface facing the first side along the axis and a plane surface facing the second side along the axis, the 3-2 lens is a biconvex lens with positive refractive power and comprises a convex surface facing the first side along the axis and another convex surface facing the second side along the axis, the 3-3 lens is a meniscus lens with negative refractive power and comprises a concave surface facing the first side along the axis and a convex surface facing the second side along the axis, and the 3-4 lens is a meniscus lens with negative refractive power and comprises a convex surface facing the first side along the axis and a concave surface facing the second side along the axis;
the fourth lens group comprises a 4-1 lens which is a meniscus lens with negative refractive power;
the fifth lens group comprises a 5-1 lens which is a meniscus lens with positive refractive power;
the lens assembly further comprise a shading element disposed between the first lens group and the second lens group, wherein the shading element comprises a variable hole, the variable hole can change dimension according to the effective focal length of the lens assembly and the variable hole is a non-circular hole;
at least one lens of the lens groups has different effective optical diameters in the short side direction and in the long side direction; and
the lens assembly satisfies at least one of following conditions:

$1.5<f1/fW<2.5;$ $-1.1<f2/fW<-0.3;$ $0.6<f3/fW<0.8;$ $-2<f4/fW<-0.5;$ $1<f5/fW<3.5;$ $2<TTL/fW<4.5;$ $0.5<fT/TTL<1;$ $3.8<TTL/D\,max<5.2;$ $7\,mm<D\,max<12\,mm;$ $2.9<fT/D1r1<4.2;$ wherein f1 is an effective focal length of the first lens group, f2 is an effective focal length of the second lens group, f3 is an effective focal length of the third lens group, f4 is an effective focal length of the fourth lens group, f5 is an effective focal length of the fifth lens group, fW is an effective focal length of the lens assembly as the lens assembly is at the wide-angle end, fT is an effective focal length of the lens assembly as the lens assembly is at the telephoto end, TTL is an interval from the incident surface of the reflective element to an image plane along the direction perpendicular to the axis and the axis, Dmax is a maximum effective optical diameter among all lenses, and D1r1 is an effective optical diameter of a first side surface of a lens closest to the first side.

* * * * *